(12) United States Patent
Stevenson et al.

(10) Patent No.: US 6,288,618 B1
(45) Date of Patent: Sep. 11, 2001

(54) LOGIC-BASED ARCHITECTURE FOR FSK MODULATION AND DEMODULATION

(75) Inventors: Carl R. Stevenson, Macungie; Yun Xiang Yuan, Emmaus, both of PA (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/467,183

(22) Filed: Dec. 20, 1999

(51) Int. Cl.[7] ............................ H04L 27/12; H04L 27/14
(52) U.S. Cl. ..................... 332/101; 329/302; 329/303; 375/272; 375/306; 375/324; 375/334; 375/335
(58) Field of Search ........................ 332/100, 101, 332/102; 329/300, 302, 303; 375/272, 303, 306, 324, 334, 335

(56) References Cited

U.S. PATENT DOCUMENTS

| | | | |
|---|---|---|---|
| 5,192,957 | * 3/1993 | Kennedy | 342/357.12 |
| 5,412,352 | * 5/1995 | Graham | 332/103 |
| 5,724,001 | * 3/1998 | Chang | 329/302 |
| 5,838,208 | * 11/1998 | Fukushi | 332/101 |
| 6,046,628 | * 4/2000 | Sasaki | 329/303 |

* cited by examiner

Primary Examiner—Siegfried H. Grimm
(74) Attorney, Agent, or Firm—William H. Bollman

(57) ABSTRACT

A cost-effective continuous phase logic-based modulator and demodulator are provided to allow communications using binary frequency shift keying (BFSK) as well as M-ary FSK techniques. The modulator of the 1-bit precision modem architecture is based on a 1-bit precision numerically controlled oscillator (NCO), which provides complete programmability with respect to a frequency of the 1-bit precision logic-based modulator and/or demodulator. The output of the 1-bit precision NCO is upconverted to an intermediate frequency using a simple logic function, i.e., XNOR logic. The undesirable portion of the upconverted signal may be suppressed using I/Q image rejection, and/or an appropriate bandpass filter may be used. A band limited, hard limited signal at the high IF is presented to the 1-bit precision demodulator as a receive IF signal, which is treated as a 1-bit quantization of the signal. The receive IF signal is digitally down-converted to a low IF signal to produce an alias signal at the low IF frequency. The received symbols are correlated with expected local frequencies representing a mark and a space. The correlation is integrated in an oversampled manner relative to the symbol interval. A decision is made as to which symbol was received using, e.g., a magnitude comparator.

26 Claims, 36 Drawing Sheets

Simplified Block Diagram of 1-bit Precision BFSK Modulator
(example using 10.7 MHz IF with low IF of 460 kHz)

1-Bit Modulator Architecture
100

Simplified Block Diagram of 1-bit Precision BFSK Demodulator

FIG. 8

| FIG. 8A | FIG. 8B | FIG. 8C |
|---|---|---|
| FIG. 8D | FIG. 8E | FIG. 8F |

Simplified Block Diagram of 1-bit Precision BFSK Modulator with Image Rejection at 1-Bit (Logic Level)
(example using 10.7 MHz IF with low IF of 460 kHz)

LOGIC-BASED ARCHITECTURE FOR FSK MODULATION AND DEMODULATION

BACKGROUND OF THE INVENTION

1. Field of the Invention

This invention relates generally to frequency shift keying (FSK) modulation and demodulation techniques. More particularly, it relates to cost-effective binary frequency shift keying (BFSK) modulator and demodulator techniques which are capable of being implemented in the digital domain with relatively simple logic gate circuitry and are also capable of being extended easily and economically to support M-ary FSK techniques where multiple bits are transmitted simultaneously through the use of overloaded symbols from a set of frequencies larger than two (2).

2. Background of Related Art

In today's digitally-oriented, increasingly mobile, wireless world, modulators and demodulators provide a necessary radio frequency ("RF") link for systems such as cordless phones, wireless networks, etc.

Many digital encoding standards exist which allow larger amounts of data to be transmitted over such wireless RF links in shorter amounts of time. For instance, one well-known digital encoding technique is frequency shift keying (FSK).

In its simplest form, FSK provides two discrete RF frequencies which can be used to transmit two data states, i.e., a '1' bit or a '0' bit. This is known as binary FSK or BFSK. In advanced forms ("M-ary FSK"), FSK may employ multiple frequencies which are each uniquely mapped to represent more than one bit per symbol, allowing the simultaneous transmission of multiple bits of data in a single symbol interval ("symbol overloading").

For instance, using four different frequencies, two (2) bits per symbol may be encoded into and transmitted simultaneously with each symbol represented by one of the four unique frequencies.

In their simplest form, binary FSK modulation techniques would produce a square wave type signal, and the signal would consequently contain a relatively high level of side lobe spectrum energy. This side lobe spectrum energy (which could cause interference to adjacent channels) is typically suppressed either by baseband pulse shaping (most common), or bandpass filtering at IF.

Baseband pulse shaping is in essence a lowpass filtering of the baseband data pulses. Bandpass filtering filters the output of the modulator at an intermediate frequency stage where a fixed frequency bandpass filter with appropriate bandwidth and shape factor may be employed. Such filtering may be accomplished either in digital form or in analog form, depending on the exact implementation. Either form of side lobe suppression utilizes a significant amount of space in a circuit, and can be relatively expensive and complicated to manufacture.

In a consumer-oriented environment in particular, costs are to be minimized. One way to accomplish this is to reduce the area and power required to perform a particular function in an integrated circuit.

Reducing power consumption is also desirable, particularly in battery-powered portable equipment. In addition to reducing costs, reduced power can extend battery life or permit the use of a smaller battery for a given period of operation before it becomes necessary to recharge the battery.

Baseband pulse shaping requires a significant amount of circuitry, either in the form of analog pulse shaping filters or in the circuitry required to generate a stepped digital approximation of the shaped pulse. The latter technique generally requires at least one, and often two, multi-bit precision Digital to Analog Converters ("DACs"), which consume significant integrated circuit area and power. Because of the costs associated with the various methods of baseband pulse shaping, elimination of the need for baseband pulse shaping would be desirable.

Bandpass filtering at an intermediate frequency can be essentially equivalent to baseband pulse shaping in terms of the suppression of undesired side lobe energy. The cost of such filtering is strongly dependent on the choice of IF frequency and the percentage bandwidth and selectivity required to adequately suppress the side lobe energy, but in many cases such filtering at IF can be less than the costs associated with baseband pulse shaping.

Side lobe energy levels are also strongly influenced by whether the FSK modulation technique results in continuous phase ("CPM") or non-continuous phase ("NCPM") modulation. CPM FSK results in side lobe levels which are approximately 27 dB below the peak level of the desired signal, whereas NCPM FSK results in side lobe levels which are only approximately 13 dB below the peak level of the desired signal. Thus, CPM FSK modulation techniques are desirable in that they inherently reduce side lobe energy levels, providing improved adjacent channel protection and reducing costs by easing filtering requirements to achieve a given level of adjacent channel protection. NCPM FSK can be produced by modulating a conventional FM modulator or PLL with shaped baseband data pulses. Traditionally, NCPM techniques have been less costly, but offer poorer performance relative to DDS-based CPM FSK techniques.

Similarly, on the demodulator side, prior art FSK demodulation techniques fall into two general categories.

First, FSK signals can be non-coherently demodulated by a variety of well-known FM demodulation techniques such as the classical limiter/discriminator, Phase-Locked Loop ("PLL") demodulators, and the commonly used "quadrature detector" frequency discriminator employed in many FM radios, followed by a "slicer" (comparator) which compares the output level from the FM demodulator to a reference level to make the "1/0" symbol value decision.

Alternatively, techniques, such analog-to-digital (A/D) and digital-to-analog (D/A) based "I/Q" demodulation and integrate and dump matched filtering can give significantly better demodulator performance. However, the improved performance comes at the expense of circuit complexity, cost, and power consumption associated with the multi-bit analog to digital converters ("ADCs") and digital signal processing which have traditionally been required by prior art implementations of such techniques.

There is a need for improved FSK modulation and demodulation techniques which result in the simplification of the circuitry involved and reduce implementation costs and power consumption, while providing performance closely approaching the theoretical ideal.

SUMMARY OF THE INVENTION

In accordance with the principles of the present invention, a continuous phase frequency shift keying modulator comprises a logic-based 1-bit precision numerically controlled oscillator adapted to alter an output frequency of an output digital signal based on an input data symbol. A 1-bit precision logic-based mixer up-converts the output digital signal output from the numerically controlled oscillator to a desired intermediate frequency.

An integrate and dump module in accordance with another aspect of the present invention comprises an up/down counter having a clock input based on a master clock signal, having a reset input based on a recovered clock signal, and having an up/down control based on a 1-bit precision correlation of two input data signals.

A continuous phase frequency shift keying demodulator in accordance with yet another aspect of the present invention comprises a first logic-based 1-bit precision numerically controlled oscillator adapted to output an In-phase output signal and a Quadrature output signal based on an expected frequency of a mark. A second 1-bit precision logic-based numerically controlled oscillator is adapted to output an In-phase output signal and a Quadrature output signal based on an expected frequency of a space. A first up/down counter is adapted to count in a direction based on a first correlation between the In-phase output signal from the first 1-bit precision logic-based numerically controlled oscillator and a received signal. A second up/down counter is adapted to count in a direction based on a second 1-bit precision correlation between the Quadrature output signal from the first logic-based numerically controlled oscillator and the received symbol. A first adder is adapted to add a magnitude of the first correlation and a magnitude of the second correlation.

A method of frequency shift keyed demodulating a data signal with logic components in accordance with still another aspect of the present invention comprises outputting a first 1-bit precision In-phase output digital signal and a first 1-bit precision Quadrature output digital signal based on an expected frequency. A first difference between the first 1-bit precision In-phase output digital signal and a received symbol is correlated with a second difference between the first 1-bit precision Quadrature output digital signal and the received symbol. The correlated first difference is integrated in an oversampled manner with respect to the received symbol interval, and the correlated second difference is integrated in an oversampled manner with respect to the received symbol interval. A magnitude of the integrated correlated first difference is added with a magnitude of the integrated correlated second difference.

BRIEF DESCRIPTION OF THE DRAWINGS

Features and advantages of the present invention will become apparent to those skilled in the art from the following description with reference to the drawings, in which:

FIGS. 20–22 show the expected results using a harmonic alias as a direct intermediate frequency, together with the use of a suitable filter (e.g., a SAW bandpass filter) having a stopband attenuation of 45 dB, 55 dB, and 65 dB, respectively, all with an LC pre-filter having a 20 MHz bandwidth.

FIGS. 23–25 show the expected results using a harmonic alias as a direct intermediate frequency, together with the use of a suitable filter (e.g., a SAW bandpass filter) having a stopband attenuation of 45 dB, 55 dB, and 65 dB, respectively, all with an LC pre-filter having a 30 MHz bandwidth.

FIG. 26 shows an exemplary output of the sampling mixer from DC to 512 MHz as a result of sub-sampling of the bandlimited 276 MHz IF frequency signal with the master clock, e.g., 10.240 MHz.

FIG. 27 is a zoomed in view of FIG. 26, showing the desired low IF at 480 KHz dominating, and the closest harmonic aliases at 10.24 MHz +/−480 KHz.

FIG. 28 is similar to FIGS. 26 and 27 but shows the use of a simple 2-pole lowpass filter at 700 KHz to suppress the higher frequency aliases.

FIG. 29 shows a simulated result of an end-to-end data IF loopback through a 12 dB Eb/No channel model, utilizing the harmonic alias direct IF frequency instead of an upconversion, in accordance with another aspect of the present invention.

DETAILED DESCRIPTION OF ILLUSTRATIVE EMBODIMENTS

Architectures and techniques for a continuous phase frequency shift keying (FSK) device are provided which operate at one (1)-bit resolution (i.e., Binary Frequency Shift Keying (BFSK)) to enable high-performance implementations with minimal chip area, power consumption, and cost. While prior implementations of FSK modems (e.g., voltage controlled oscillator (VCO) based modems) provided non-continuous phase output signals, the present invention implements a continuous phase FSK technique. Moreover, using the present continuous phase techniques, an amount of frequency shift (modulation index, deviation) from device to device will be consistent, as opposed to variations seen in conventional FSK devices using, e.g., VCOs.

While shown in the specific implementations of binary FSK (BFSK), the principles of the present invention regarding both the modulator and demodulator techniques relate equally to M-ary FSK implementations.

The disclosed architecture and techniques provide the ability to implement an entire FSK modem (e.g., an entire FSK radio modem) with relative simplicity. The disclosed embodiments are implemented entirely with logic gates, or at least without the need for multiple-bit analog-to-digital or digital-to-analog converters, resulting in a significant reduction in chip area, power consumption, and cost relative to conventional techniques. The disclosed FSK modems find many uses, e.g., in cordless telephones.

Frequency shift keying (FSK) modulators in accordance with the principles of the present invention are based on a novel, digital architecture, and preferably coupled with simple, inexpensive bandpass filtering at an IF frequency. This permits the advantages of CPM FSK modulation techniques to be realized in integrated circuit form at very low cost, complexity, and power consumption relative to the prior state of the art. Similarly, demodulators in accordance with the principles of the present invention are likewise based on a novel, digital architecture which permit the advantages of I/Q demodulation and integrate and dump matched filter FSK demodulation techniques to be realized at low cost, complexity, and power consumption relative to the prior state of the art.

Figure 1:
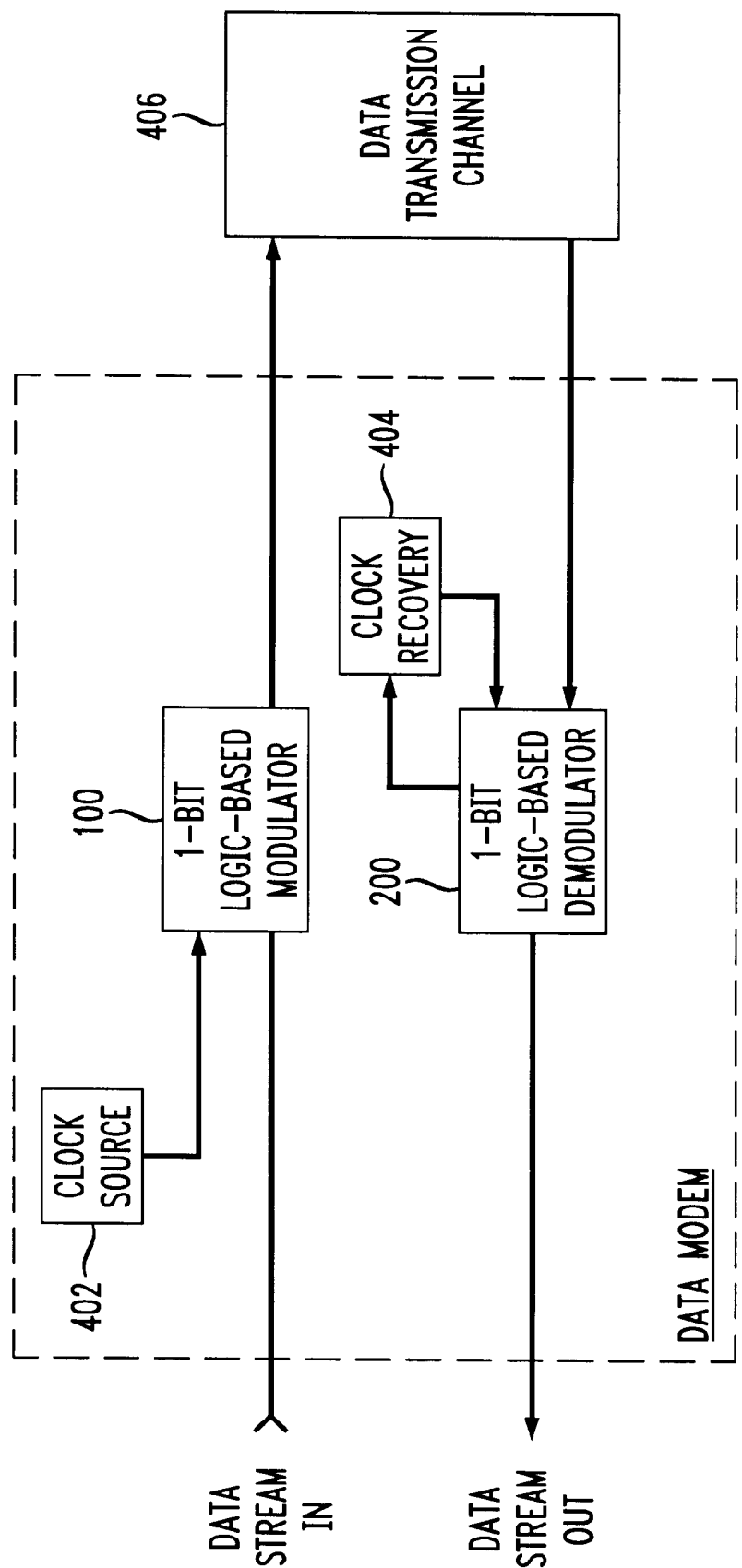
FIG. 1 is a general block diagram of an embodiment of a data modem incorporating a 1-bit precision modulator and 1-bit precision demodulator to perform binary frequency shift keying (BFSK) communications, in accordance with the principles of the present invention.

FIG. 1 is a general block diagram of an embodiment of a data modem incorporating a 1-bit precision modulator and 1-bit precision demodulator to perform binary frequency shift keying (BFSK) communications, in accordance with the principles of the present invention. As shown, the data modem allows half- or full-duplex communications over an appropriate wired or wireless data transmission channel 406 (e.g., between a remote handset and a matching base unit in a digital cordless telephone).

In FIG. 1, the exemplary data modem includes a 1-bit precision logic-based modulator 100 in a transmission path, and a 1-bit precision logic-based demodulator 200 in a receive path. While the disclosed embodiment provides a logic-based architecture for both a 1-bit precision modulator and a 1-bit precision demodulator, the principles of the present invention relate to either one or both.

The 1-bit precision logic-based modulator 100 is provided with a master clock signal from a clock source 402. Moreover, the 1-bit precision logic-based demodulator 200 in the exemplary embodiment utilizes a recovered clock signal from a clock recovery circuit 404 for receiving data in the receive path.

In accordance with the principles of the present invention, the transmitted BFSK signal is not necessarily pulse shaped, and thus a significant amount of side lobe spectral energy generally associated with BFSK may be generated.

To reduce or eliminate the side lobe spectral energy, a band pass filter may be included, e.g., in the transmit IF path. Ideally, the band pass filter is specified such that any abundantly available (and thus inexpensive) band pass filter can be used, e.g., a 10.7 MHz ceramic band pass filter. Other standard intermediate frequency (IF) frequencies having abundantly available band pass filters include 21.4 MHz, 45 MHz, 70 MHz, 71 MHz, and even 110 MHz SAW filters, to name a few.

The transmission path into the 1-bit precision logic-based modulator 100 accepts a DATA STREAM IN signal containing data bits of data to be transmitted over the data transmission channel 406. Similarly, the 1-bit precision logic-based demodulator 200 provides a DATA STREAM OUT signal containing data bits of data received over the data transmission channel 406.

An important basis of the present invention is the formation of the 1-bit precision modulator 100 and/or the formation of the 1-bit precision demodulator 200 in such a way as to avoid the necessity for a multi-bit digital-to-analog (D/A) converter and analog-to-digital (A/D) converter, respectively.

Figure 2:
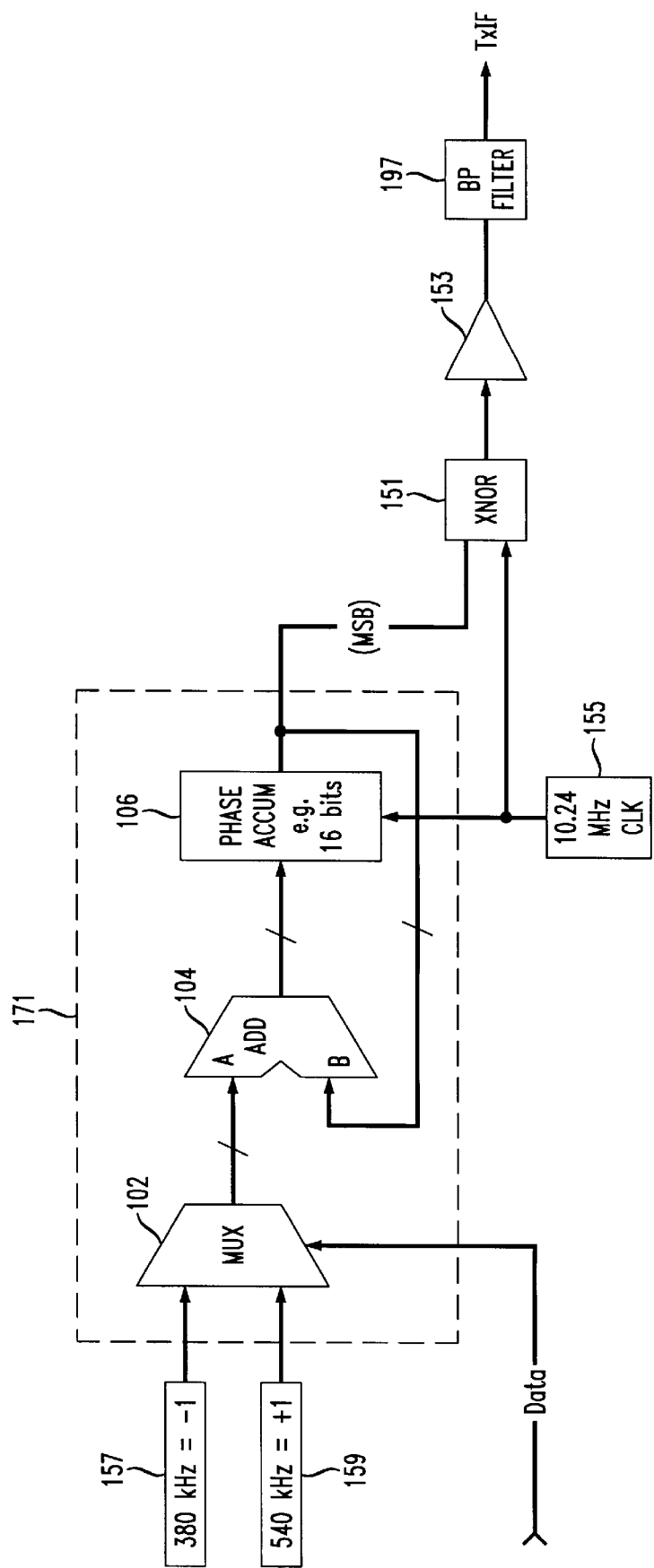
FIG. 2 is a schematic diagram of an exemplary 1-bit precision modulator as shown in FIG. 1, constructed in accordance with the principles of the present invention.
Figure 3:
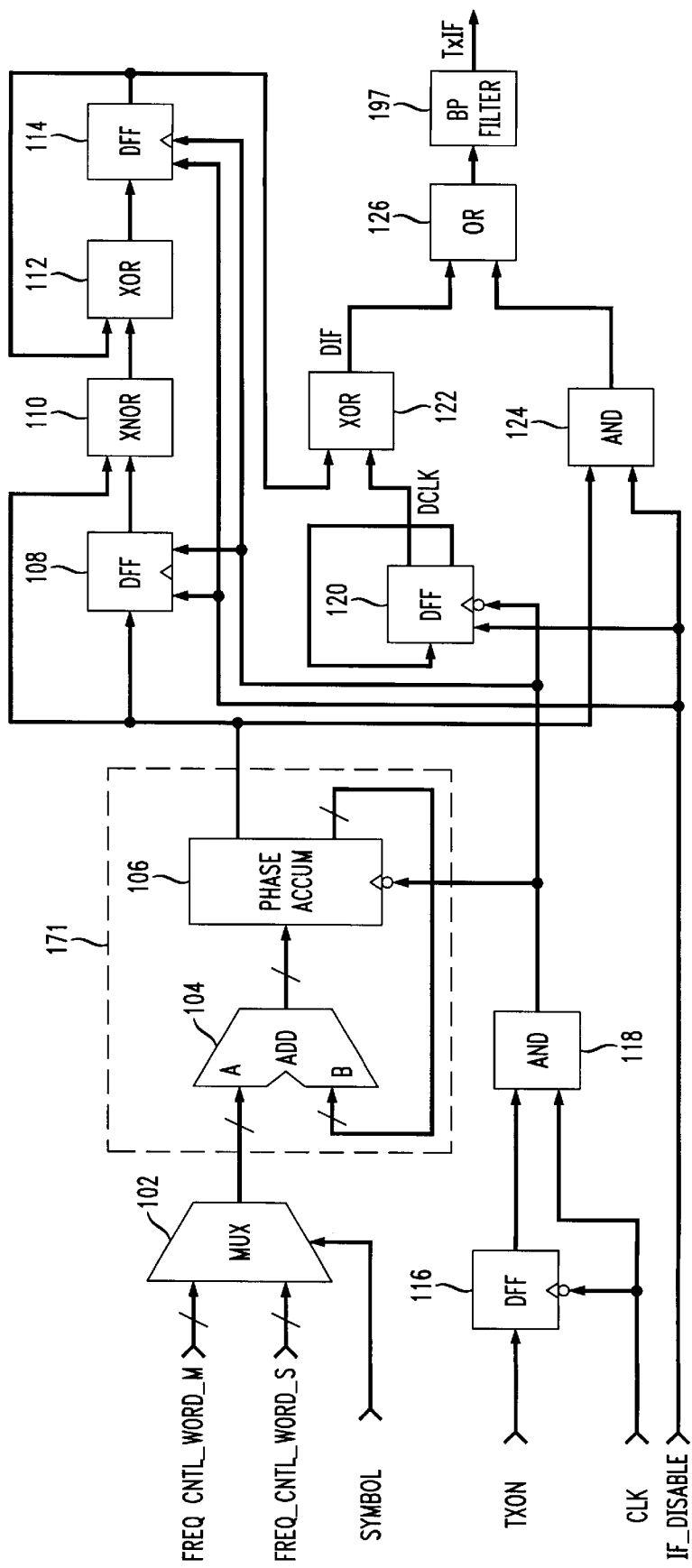
FIG. 3 is a more detailed schematic diagram of an exemplary 1-bit precision modulator as shown in FIG. 2, constructed in accordance with the principles of the present invention.

FIGS. 2 and 3 are detailed schematic diagrams of an exemplary 1-bit precision logic-based modulator constructed in accordance with the principles of the present invention.

A logic-based BFSK modulator in accordance with the principles of the present invention comprises a logic-based, 1-bit precision (square wave output) numerically controlled oscillator ("NCO") 171, clocked by the system master clock frequency 155 (or some easily-derived derivative thereof).

Figure 4:
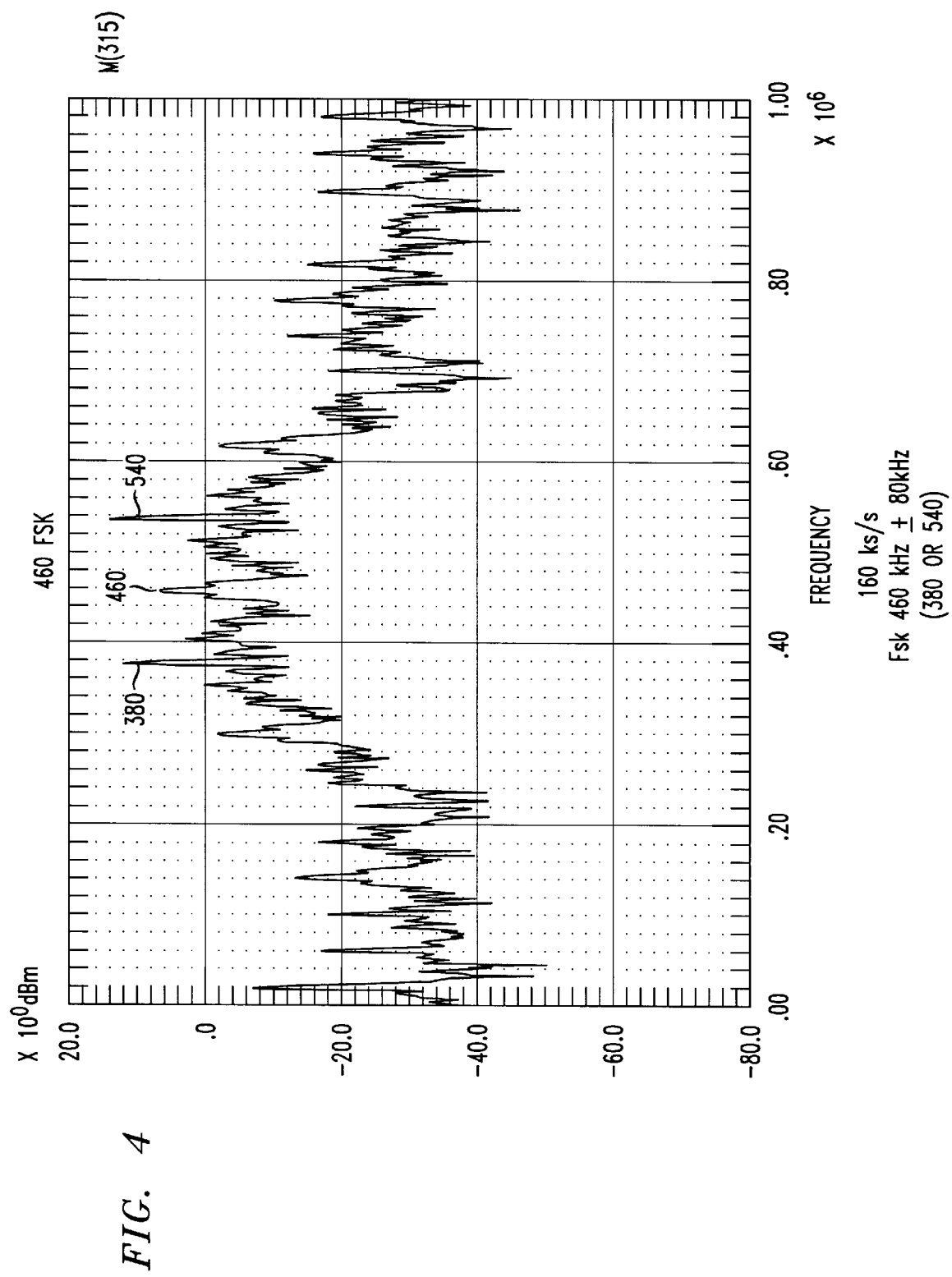
FIG. 4 shows a simulated output spectrum from the numerically controlled oscillator (NCO) shown in FIGS. 2 and 3 having a conceptual center frequency at 460 KHz, and a symbol rate of 160 kilosymbols/second (kS/S).

FIG. 4 shows a simulated output spectrum relating to the signal output from the NCO 171 shown in FIGS. 2 and 3.

In particular, in the given example, the signal output from the NCO 171 has a conceptual center frequency at 460 KHz, and a symbol rate of 160 kilosymbols/second (kS/S). This provides FSK between 460 KHz +/−80 KHz (i.e., 380 KHz and 540 KHz). In the given example, the FSK at 380 KHz relates to a mark, and the FSK at 540 KHz relates to a space in the data stream being transmitted.

Referring back to FIG. 2, a logic-based upconverter 151, driven by the system master clock frequency 155 (or some easily-derived derivative thereof) up-converts (mixes) the 1-bit precision BFSK-modulated low IF to a second, higher frequency intermediate frequency, still at 1-bit precision (a square wave signal). The upconverted signal TxIF may be economically bandpass filtered to eliminate undesired side lobe spectral energy and other spurious products of the modulation and upconversion processes.

Figure 5:
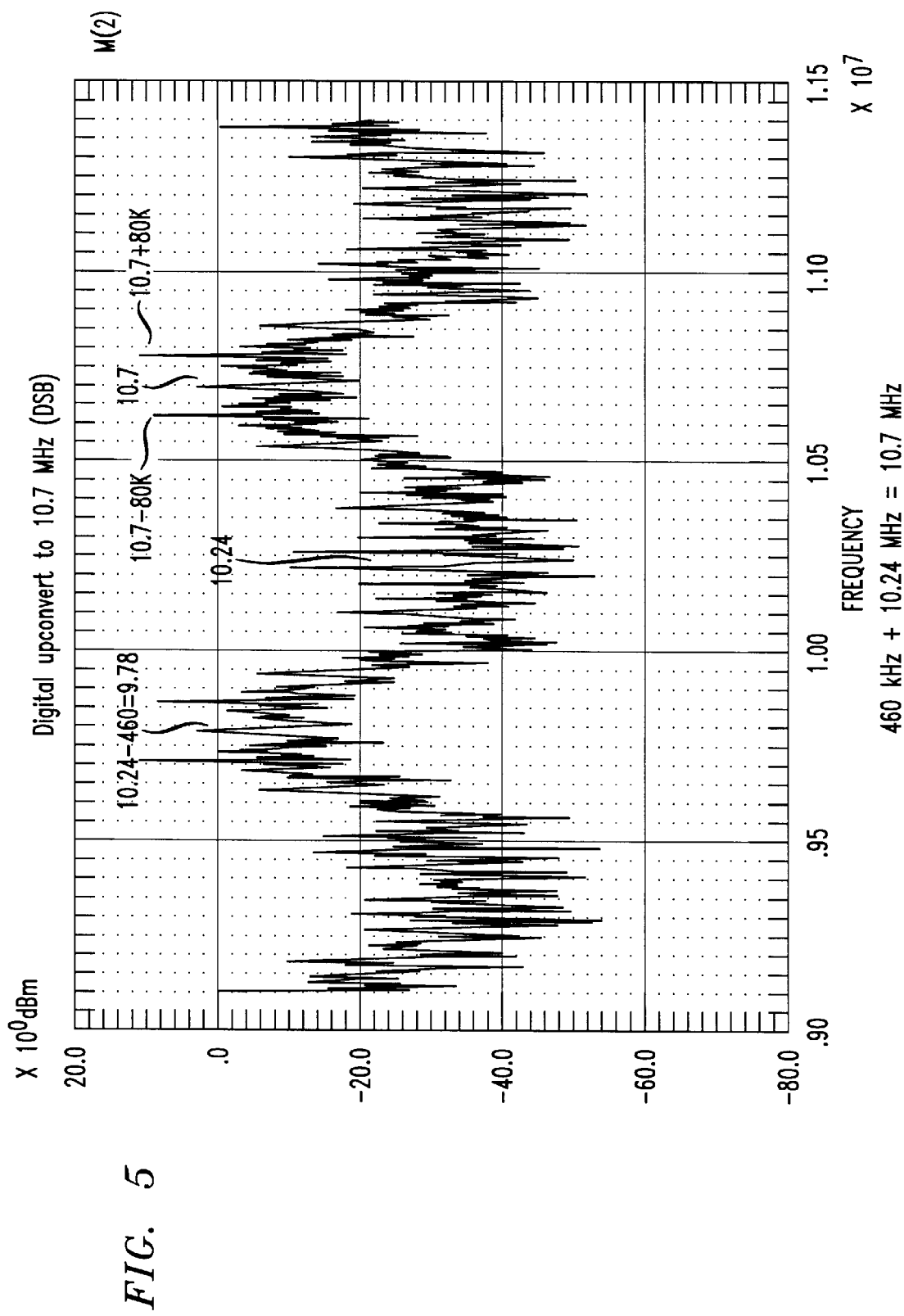
FIG. 5 shows a simulated output spectrum from the modulator shown in FIGS. 1–3 after upconversion of the signal shown in FIG. 4 to a conceptual center frequency of 10.24 MHz, showing an upper sideband centered at 10.7 MHz.

FIG. 5 shows a simulated output spectrum from the modulator shown in FIGS. 1–3 after the upconverter 151 (e.g., XNOR gate) provides an upconversion of the signal shown in FIG. 4.

In particular, as shown in FIG. 4, the upconverted double sideband signal has a conceptual center frequency of 10.24 MHz.

Based on the conceptual center frequency 460 KHz centered between the mark frequency (e.g., 380 KHz) and space frequency (e.g., 540 KHz), the upconverted signal has an FSK modulated first upper sideband at 10.24 MHz+460 KHz=10.7 MHz, and an FSK modulated sideband first lower sideband at 10.24 MHz−460 KHz=9.78 MHz. The upper sideband is selected for use in this example of the present invention, e.g., because of the profusion of bandpass filters centered at that frequency, e.g., 10.7 MHz.

In this example, the IF signal at 10.7 MHz has a space tone at 10.7 MHz+80 KHz (half the symbol rate), and a mark tone at 10.7 MHz−80 KHz. Similarly, the IF signal at the lower sideband region has a mark tone at 9.78 MHz+80 KHz, and a space tone at 9.78 MHz−80 KHz.

The desired copy of the FSK signal (e.g., the upper sideband at 10.7 MHz in this example) is selected by a 10.7 MHz bandpass filter 197, and the undesired copy (e.g., the lower sideband at 9.78 MHz) is rejected by the bandpass filter 197, as are all of the other aliases extending well into the ultra high frequency (UHF) range.

Referring back to FIG. 2, the modulator 100 of the 1-bit precision modem architecture is based on a 1-bit precision numerically controlled oscillator (NCO) formed essentially by an adder 104 and a phase accumulator register 106. The use of an NCO allows full programmability of the frequency. It is preferred that pulse shaping is not performed on the generated digital logic square wave output signal.

The phase accumulator register 106 is, e.g., a word-wide latch which is clocked by a master clock signal CLK from a master clock 155. The frequency of the master clock signal CLK (e.g., 10.24 MHz) is determined from a desired upconversion frequency.

The NCO 171 is programmed to generate a 1-bit precision (square wave) BFSK modulated signal at a relatively low IF frequency by altering its output frequency based on the value of an input data symbol. The specific symbol frequencies 157, 159 which the NCO 171 generates may either be "hard-wired" into the NCO logic or may be programmable by storing appropriate values into a set of storage registers associated with the NCO's control logic. In any event, the mark and space frequencies 157, 159 are determined by, e.g., 16-bit values representing the desired frequency (e.g., 380 KHz and 540 KHz in the given example using a 16 bit phase accumulator 106), respectively.

FIG. 3 is a more detailed schematic diagram of an exemplary 1-bit precision demodulator as shown in FIG. 2, constructed in accordance with the principles of the present invention.

In particular, as shown, the modulated output signal is upconverted using the XNOR gate 151 to a double sideband signal centered at 10.24 MHz where each of the upper and lower sidebands is a copy of the FSK signal. The master clock signal CLK may be enabled/disabled to the phase accumulator register 106 by a transmit ON TXON signal using, e.g., a D-type Flip-Flop (DFF) 116 (FIG. 3).

The upconverter 151 (i.e., XNOR gate) essentially forms a 1-bit multiplier which performs a mixing process between the lower digital IF frequency and the master clock (or derivative).

The most significant bit (MSB) of the output word of the phase accumulator register 106 is a square wave having a frequency determined by the value of the phase increment word input to a first input port A of the adder 104. In particular, the MSB toggles at a maximum of one half the frequency of the master clock 155, but in the given example toggles either at 380 KHz (Mark) or at 540 KHz (Space).

To extend this architecture to permit the generation of M-ary FSK, it is merely necessary to add a logic block to encode multiple bits into control signals which select the appropriate additional NCO output frequencies required to represent the overloaded symbols of M-ary FSK.

The entire output word of the phase accumulator 106 is fed back to a second input port B of the adder 104, resulting in a series of additions of the phase increment (from port A) to the previous contents of the phase accumulator register (from port B).

Preferably, the NCO 171 is operated at a relatively low intermediate frequency (IF) consistent with the desired modulation bandwidth to minimize power consumption.

D type Flip/Flops 108, 120 provide deglitching of the output of the NCO 171 and the master clock signal CLK, respectively. An exclusive NOR gate (XNOR) 110 conceptually mixes the output of the NCO 171 with the master clock signal CLK (e.g., at 10.24 MHz in the example) to generate a transmitted output signal TXIF (e.g., centered at 10.7 MHz in the disclosed embodiment).

In the disclosed embodiment, the data modem (FIG. 1) is used in the communication path between the base and remote handset of a cordless telephone. In such an embodiment, the MSB of the output word from the phase accumulator register 106 (i.e., its "frequency") has a carrier frequency of 460 KHz, and transmits 160 Ksymbols/sec (wherein each symbol is 1 bit in length in a BFSK application). Thus, the frequency difference between a mark (i.e., a logic HIGH bit or symbol) and a space (i.e., a logic LOW bit or symbol) is 160 KHz, which is equal to the data rate.

The output signal TXIF generates a square wave signal with side lobe spectral energy. For instance, in the disclosed embodiment, an upper sideband is located at 10.24+0.460= 10.7 MHz, and a lower sideband is located at 10.24−0.460= 9.78 MHz.

Inexpensive and simple band pass filters are abundantly available at 10.7 MHz, which is a commercially common IF. Thus, a corresponding band pass filter 197 can be inexpensively implemented.

FSK modulation is accomplished by using the symbol value SYMBOL (e.g., a single bit for BFSK) to select one of N phase increment words by means of a multiplexer 102.

The multiplexer 102 has two inputs, corresponding to a mark and a space, respectively. The multiplexer 102 generates a binary frequency shift keyed (BFSK) output. The architecture in accordance with the principles of the present invention, while relating to the specific embodiment of BFSK, can be easily adapted to M-ary FSK. For instance, the multiplexer 102 may be replaced with an M-to-1 (M:1) multiplexer accepting multi-bit symbol values SYMBOL to permit an arbitrary number of discrete tone frequencies to be generated.

The output of the 1-bit precision NCO 171 is de-glitched by re-clocking or gating the master clock signal CLK clock using a D-type Flip-Flop 120 to provide a de-glitched master clock signal DCLK. The output of the 1-bit precision NCO 171 is exclusive NORed (XNORed) with the de-glitched master clock signal DCLK to accomplish an up-conversion to the desired IF frequency.

In the disclosed embodiment, the conceptual center frequency is selected by mixing or XNORing the desired IF frequency with the de-glitched master clock signal DCLK in an XOR gate 122 to obtain a signal product having the desired higher transmit intermediate frequency TXIF.

The "mark" and "space" frequencies generated at the low IF output of the 1-bit precision NCO 171 in the block diagram would ideally be selected such that they are equidistant above and below the conceptual center frequency of the low IF and separated by a frequency equal to the symbol interval, thus producing orthogonal BFSK. (M-ary FSK would require selection of appropriate tone frequencies for the symbols to produce orthogonal signaling.)

The up-conversion of the low IF signal to the higher transmit IF signal is accomplished by simply XORing the output of the NCO 171 having the low IF with the de-glitched master clock signal DLCK to produce a square wave (1-bit resolution) FSK signal at the higher IF.

The high IF output has significant spectral components because it is a logic level square wave. Thus, the high IF output signal is preferably bandpass filtered at the high IF using a suitable bandpass filter 197 to eliminate undesired out of channel spurious products, and/or to reduce the spectral side lobes caused by modulation, to reduce adjacent channel interference to an acceptable level.

Figure 6:
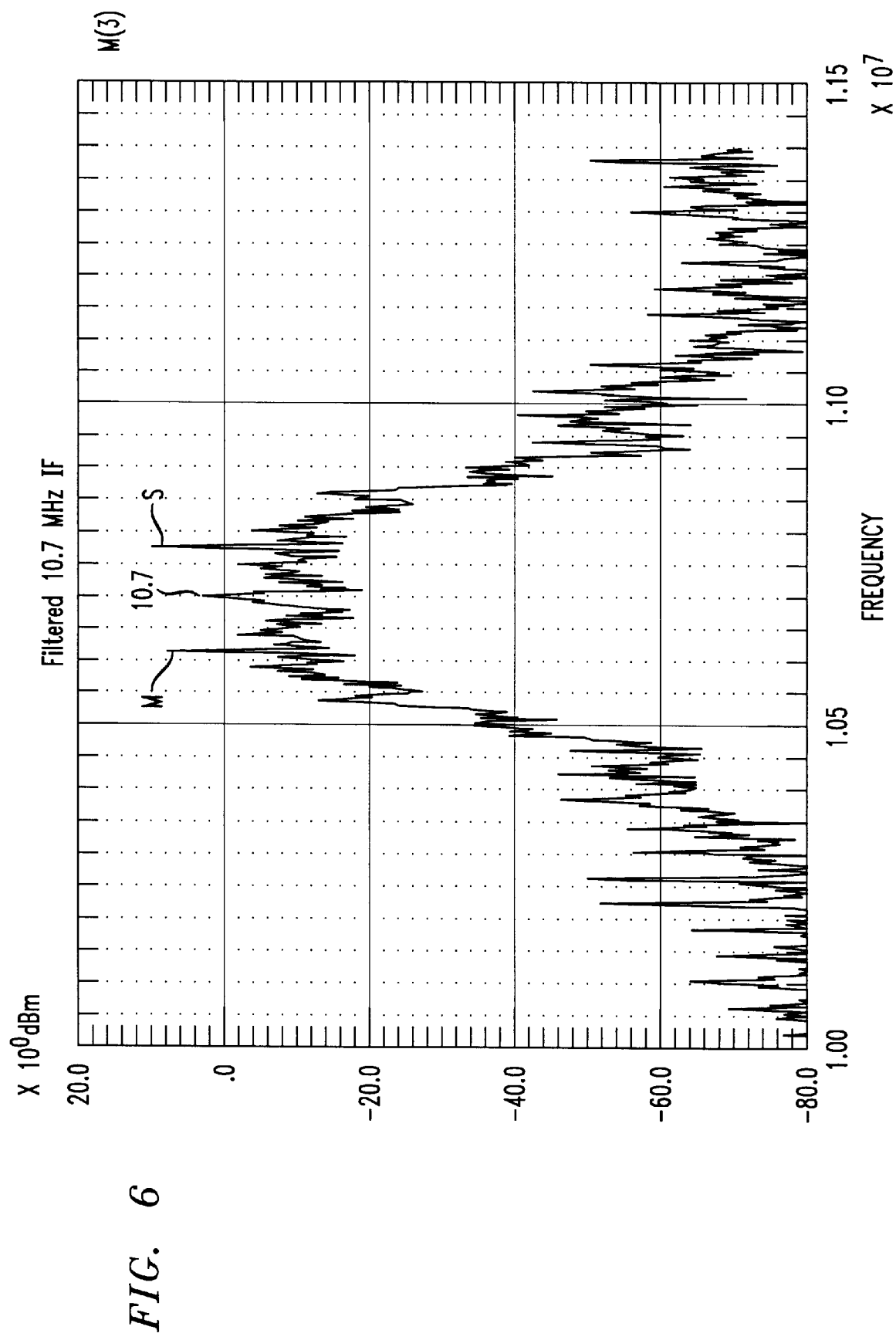
FIG. 6 shows a simulated upconverted output spectrum of the signal shown in FIG. 5 after bandpass filtering of the upper side band, in accordance with the principles of the present invention.

FIG. 6 shows a simulated upconverted output spectrum of the signal shown in FIG. 5 after bandpass filtering of the upper sideband, in accordance with the principles of the present invention. (Note that the lower sideband could be used as well.)

In particular, in FIG. 6, the upper sideband at 10.7 MHz is shown, with undesirable frequencies being significantly suppressed from the peak power level at the desired mark M and space S frequencies. For instance, as shown in FIG. 6, the mark M and space S frequencies reach a level of approximately 8 to 10 dBm, whereas the suppressed frequencies are in the −50 to −60 dBm range-a 60 to 70 dBm difference.

Referring back to FIG. 3, the frequency of the low IF signal and the frequency of the master clock signal CLK are preferably selected to produce an arbitrarily high IF (such as 10.7 MHz, using a 10.24 MHz clock and a low IF of 460 kHz) where low cost filters are readily available.

In a cordless telephone application, the 10.7 MHz TXIF signal is filtered, up-converted to an appropriate 900 MHz band, and transmitted using conventional RF techniques.

Thus, a 1-bit precision modulator has been described formed entirely from logic gates (or at least without the use of any multi-bit D/A converters, complicated DSP processing, etc.) Nevertheless, the performance of the 1-bit precision modulator has been shown to be entirely adequate.

Figure 7A:
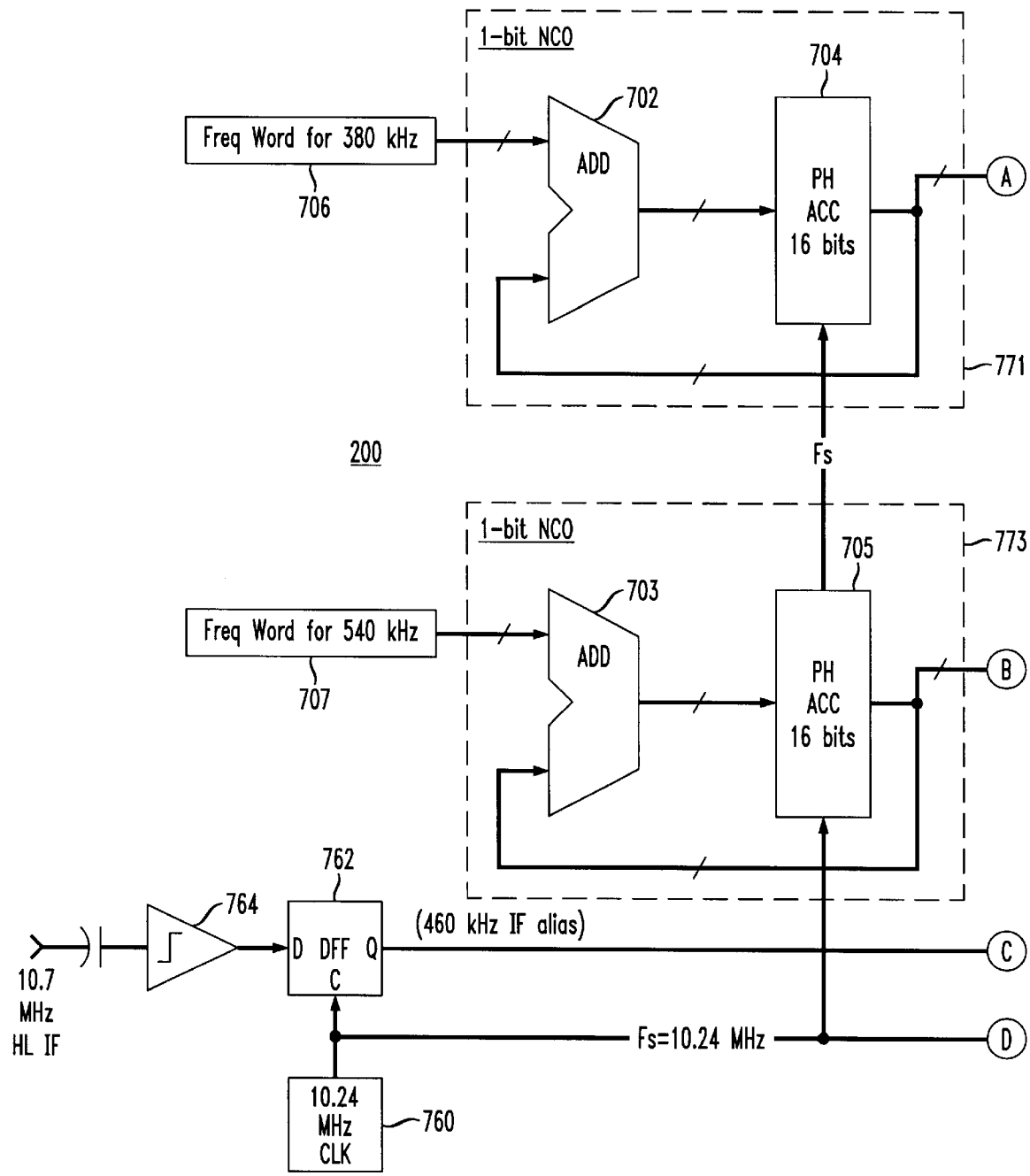
FIG. 7 shows a simplified block diagram of a 1-bit precision BFSK demodulator, in accordance with the principles of the present invention.
Figure 7B:
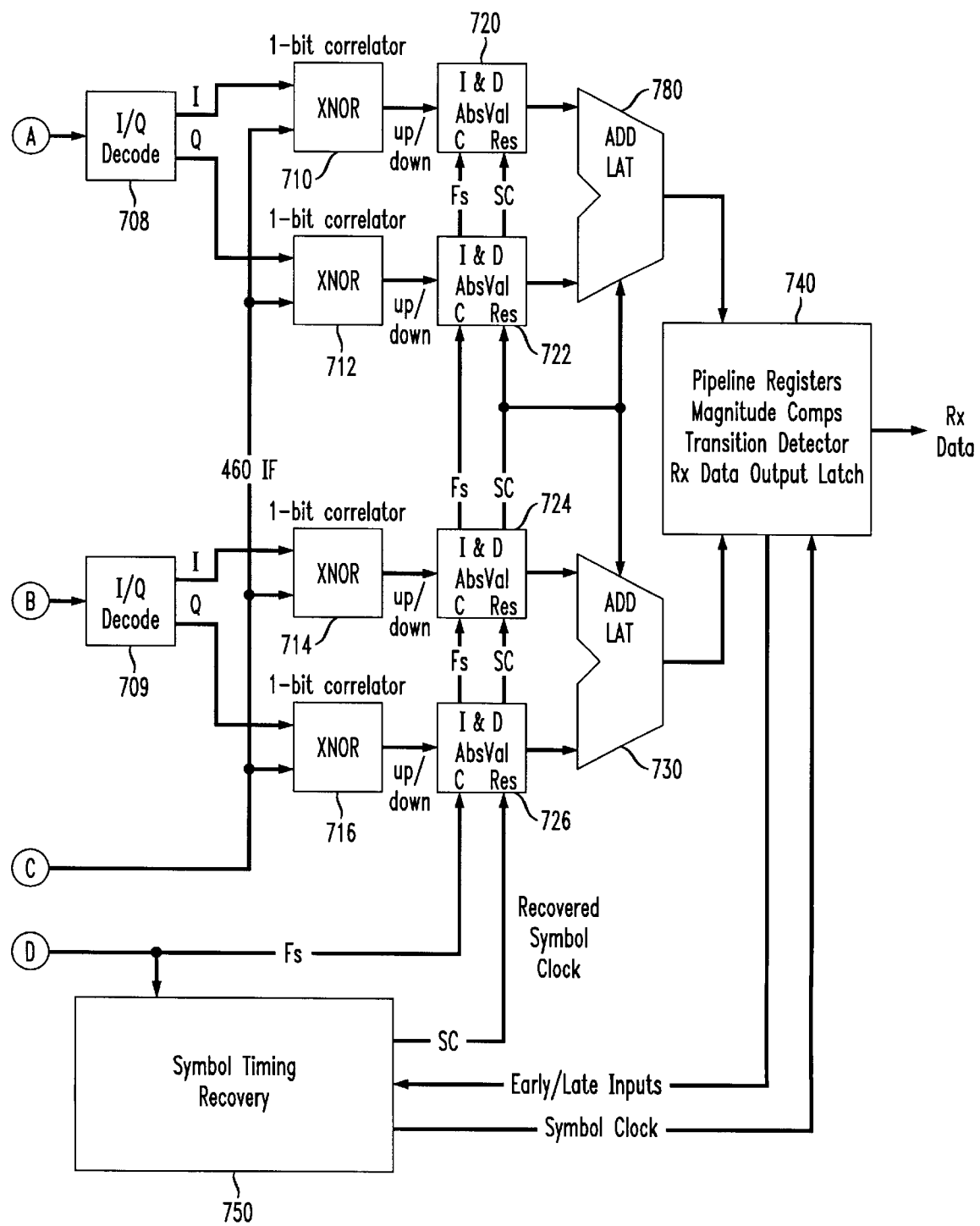
Figure 8A:
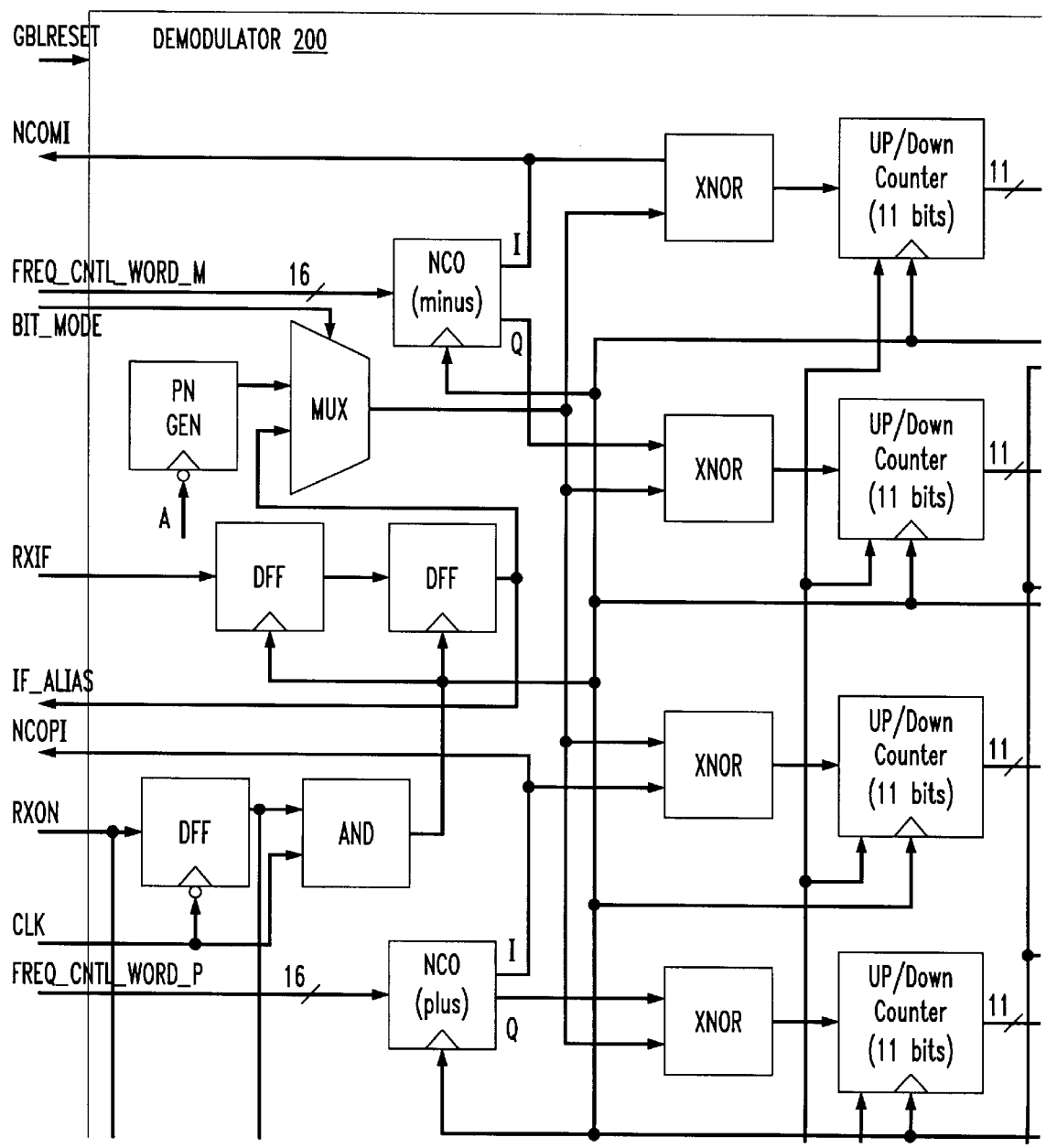
FIG. 8 is a more detailed schematic diagram showing an embodiment of the exemplary implementation of the 1-bit precision BFSK demodulator shown in FIG. 7.
Figure 8B:
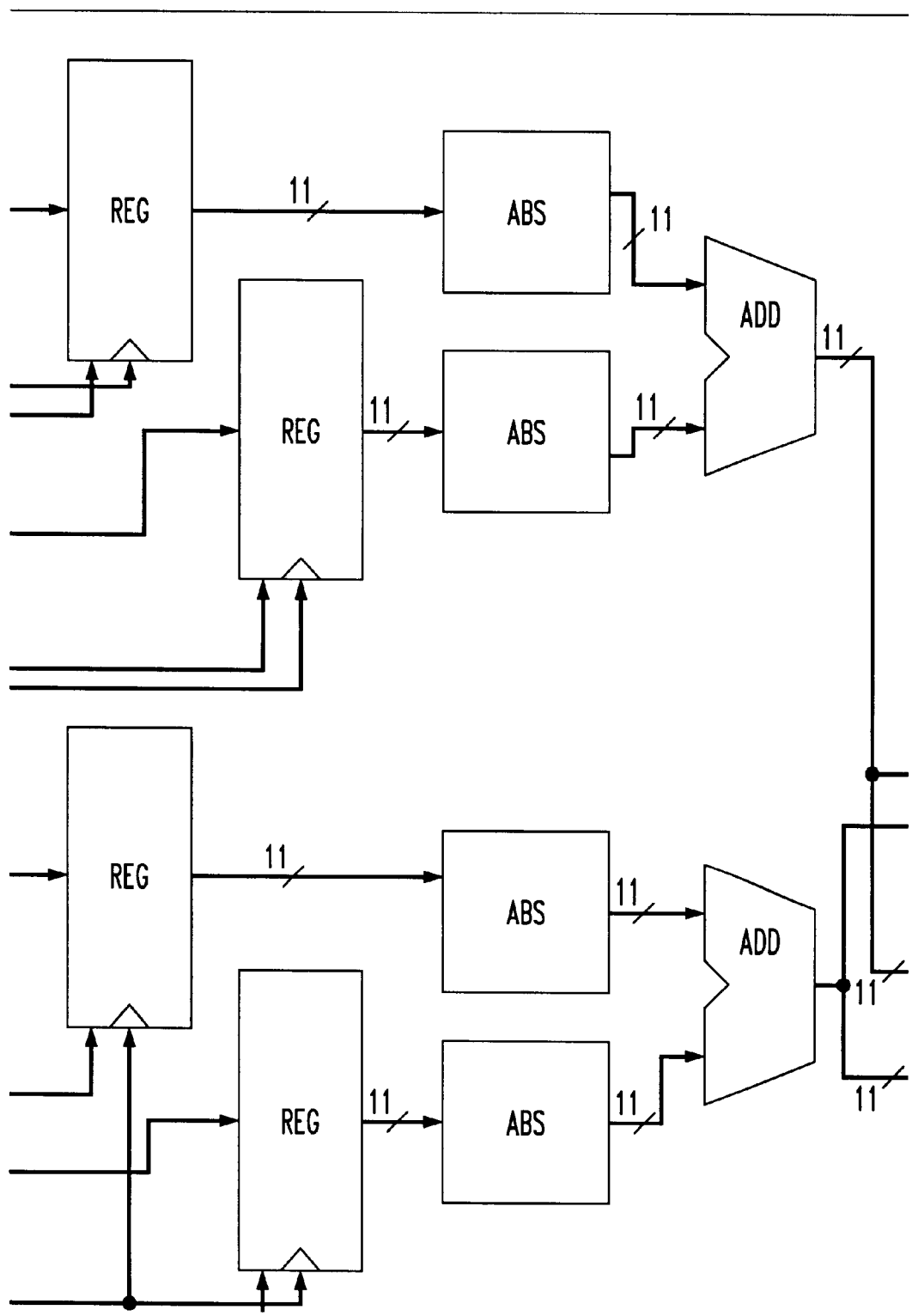
Figure 8C:
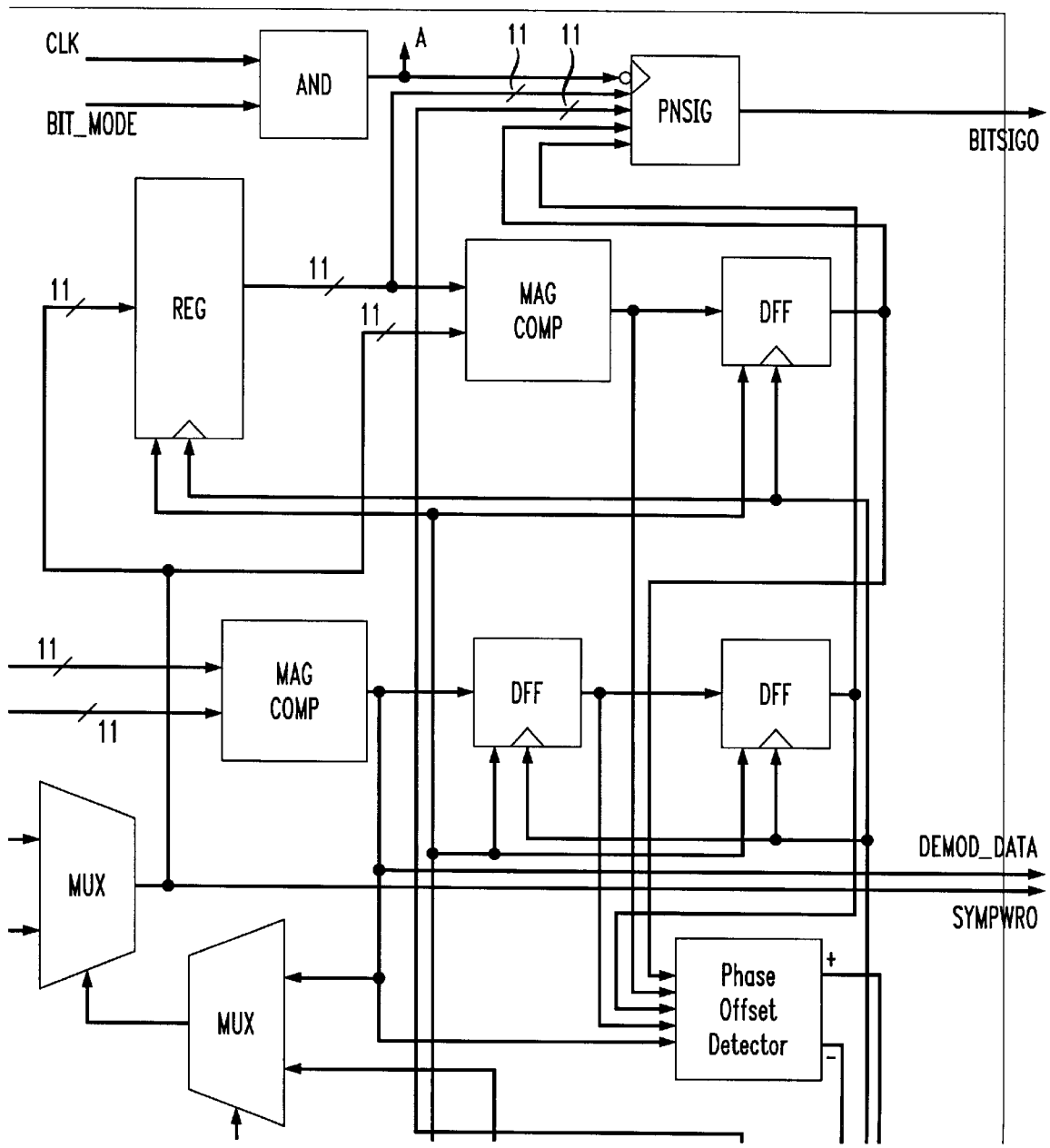
Figure 8D:
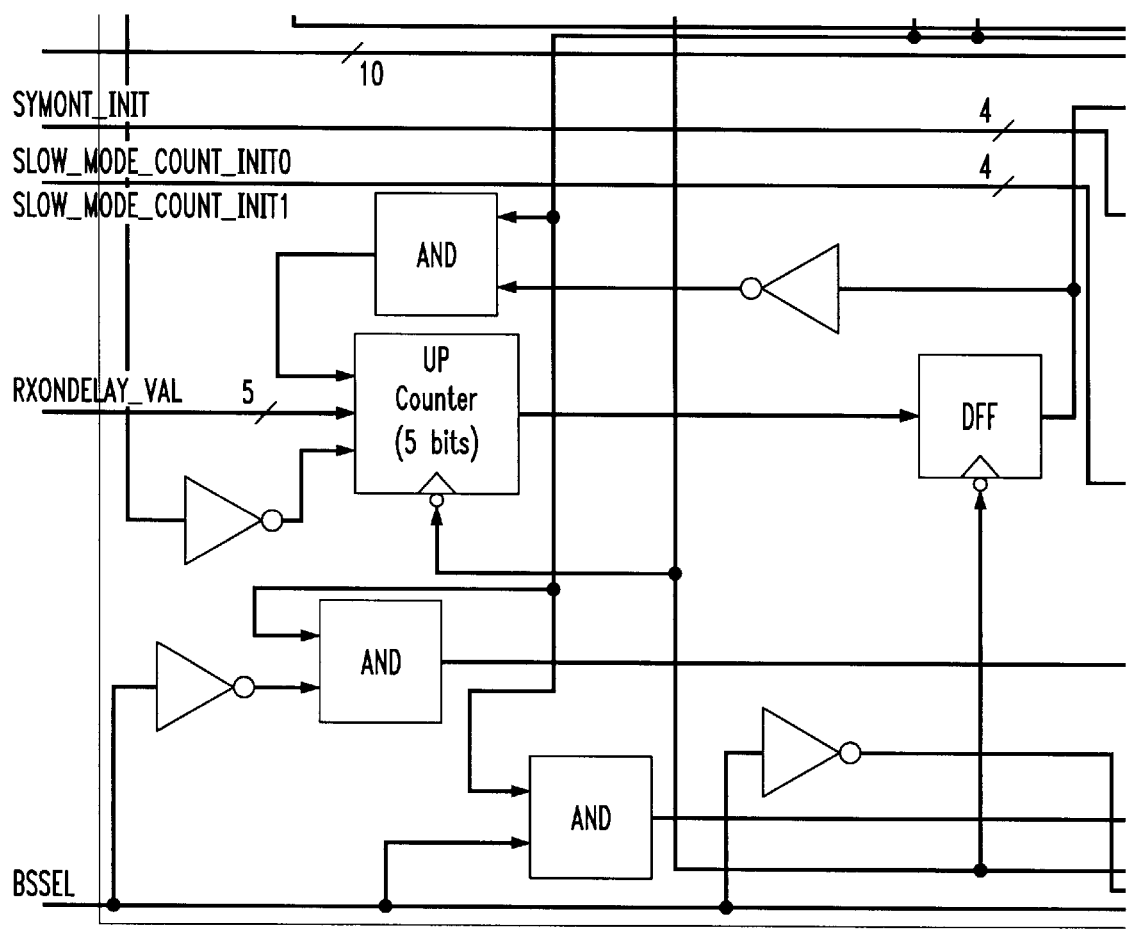
Figure 8E:
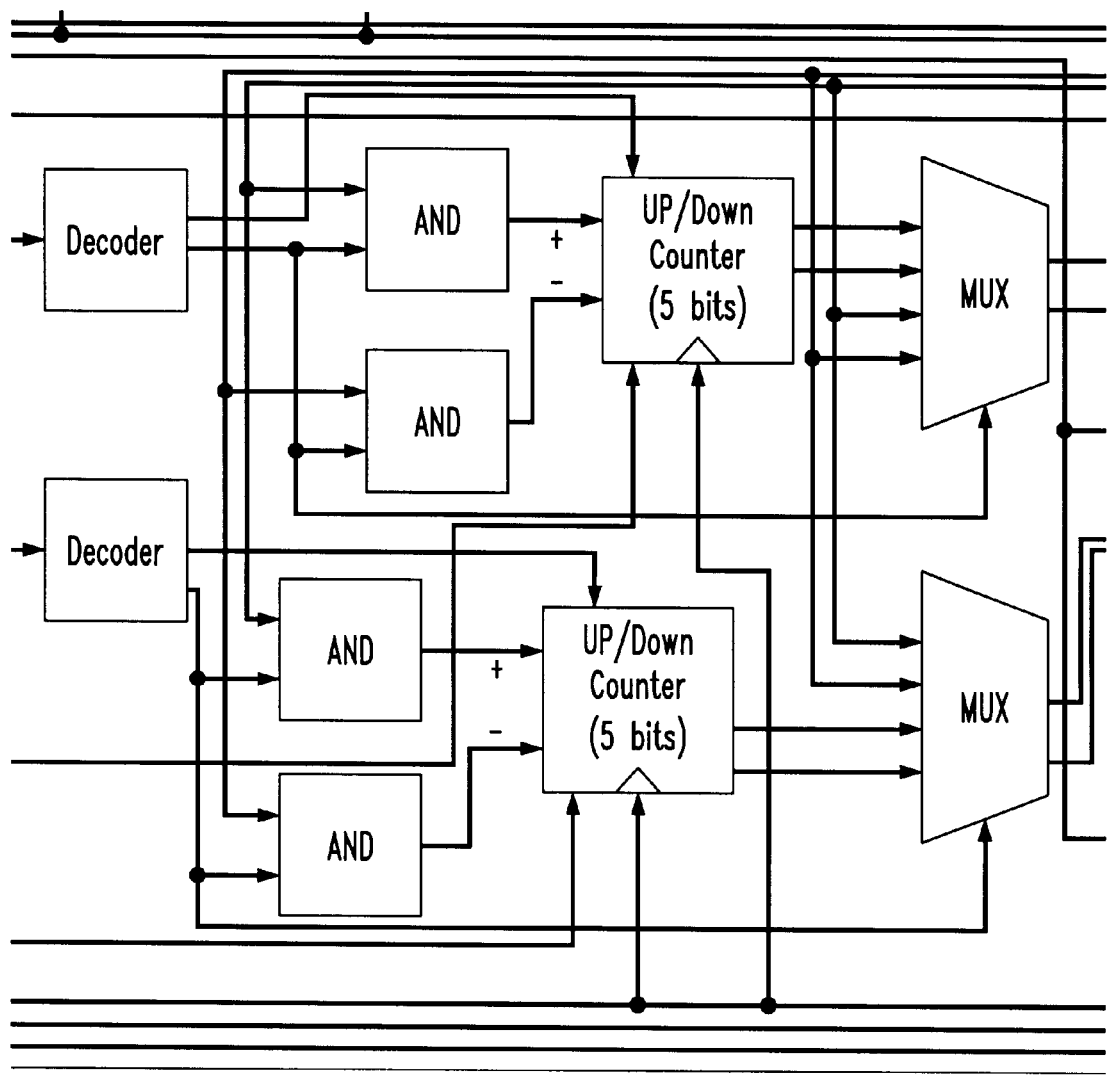
Figure 8F:
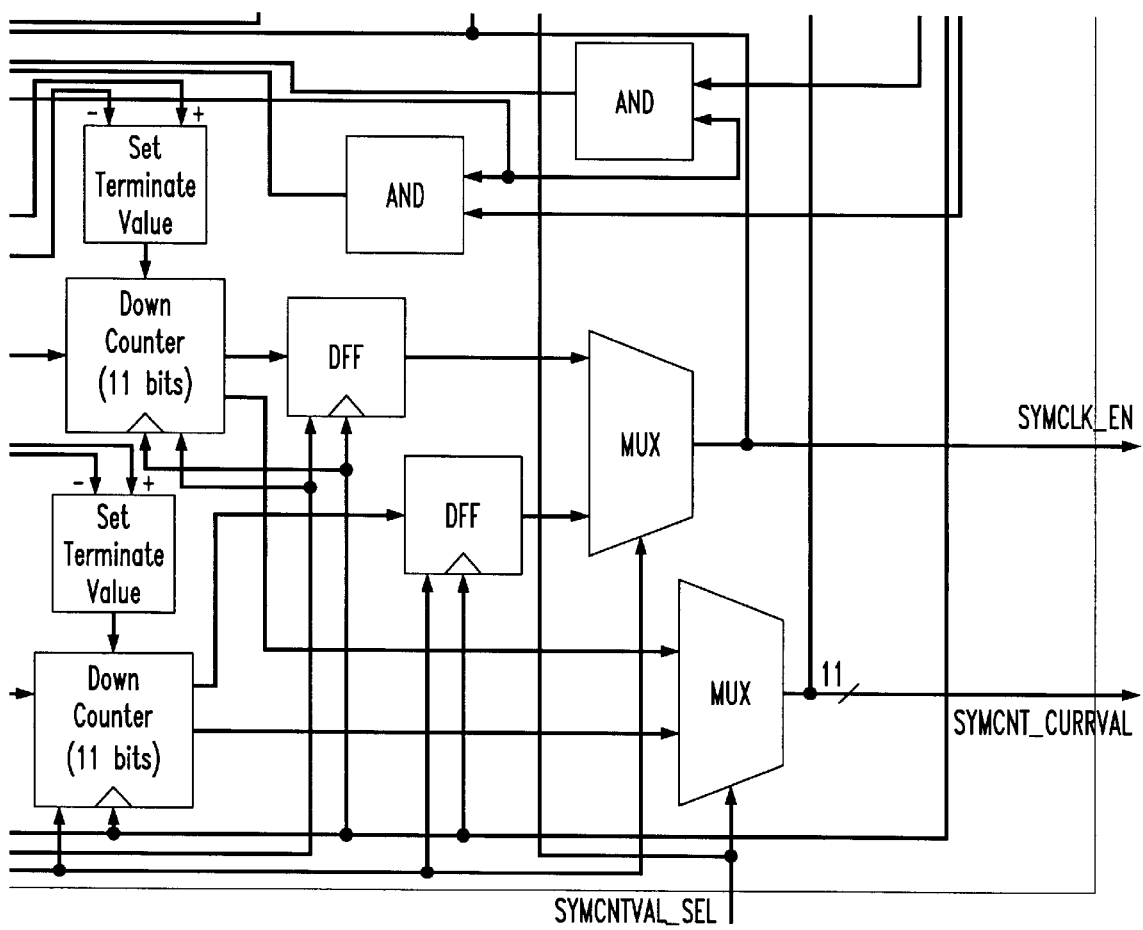

FIG. 7 shows a simplified block diagram of a 1-bit precision BFSK demodulator 200, in accordance with the principles of the present invention, and FIG. 8 is a more detailed schematic diagram showing an embodiment of the exemplary implementation of the 1-bit precision BFSK demodulator 200 shown in FIG. 7.

In particular, the 1-bit precision logic-based demodulator 200 shown in FIG. 1 in accordance with the principles of the present invention, while being moderately complex, can be implemented entirely in logic gates as is the case with respect to the 1-bit precision modulator 100 shown in FIGS. 2 and 3. Moreover, similar to the 1-bit precision modulator shown in FIGS. 2 and 3, the disclosed 1-bit precision demodulator shown in FIGS. 7 and 8 does not require multi-bit analog to digital (A/D) converters, thus again providing the opportunity for reduced chip area, power consumption, and cost.

As shown in FIG. 7, a logic-based BFSK demodulator 200 in accordance with another aspect of the present invention includes an input comparator 764 which operates on a band-limited, hard-limited signal at the previously mentioned higher IF frequency (generally, though not necessarily) the same frequency as the output of the companion modulator 100). The comparator 764 is effectively a 1-bit precision ADC, and serves to perform a 1-bit quantization of the higher IF signal. The comparator 764 outputs a logic level (square wave) representation thereof. The comparator 764 is self-biasing.

This quantization process is followed by a simple, logic-based digital downconverter 762, which sub-samples the logic level representation of the higher IF at a sample rate (generally, though not necessarily) equal to the system master clock frequency 760 (or the same easily-derived derivative thereof) as was employed in the modulator. The D-type flip/flop (DFF) 762 acts like a mixer with a low pass function, and thus mixes the received data signal down to, e.g., the 460 KHz conceptual center frequency.

This sub-sampling process results in the creation of an aliased copy of the high IF signal at the same low IF as was employed in the first stage of the companion modulator 100 (assuming the same high IF and clock frequencies are used as were used in the companion modulator 100). This process is analogous to mixing or downconversion in the analog domain.

This low digital IF signal is subsequently applied to one input of each of an array of 2-input, 1-bit digital multipliers 710–716 (in the case of BFSK, the array consists of four (4) 1-bit multipliers 710–716), which serve as simple 1-bit correlators. In the given example, the correlators 710–716 are formed from XNOR gates, and output a given state if the two input signals agree, and output a different state if the two input signals do not agree.

The array of 1-bit correlators 710–716 comprises two (2) pairs 710, 712 and 714, 716 of correlators, with each pair respectively representing both the in-phase ("I") channel 710, 714 and the quadrature-phase channel 712, 716 for each of the discrete frequencies representing a "1"-valued symbol and a "0"-valued symbol at the appropriate low digital IF. These discrete frequencies are provided by the local frequency references 706, 707.

The other inputs to each of the I and Q channel pairs of the 1-bit correlators 710–716 are driven by a pair of 1-bit precision (square wave output) NCOs 771, 773 which are programmed to respectively output both in-phase ("I) and quadrature-phase ("Q") reference signals at the appropriate "1" and "0" symbol frequencies in the low digital IF band.

The outputs of the respective I/Q pairs of 1-bit correlators 710–716 will be at a logic "1" ora logic "0," depending upon whether the IF signal and the locally-generated reference signals are at equal or opposite logic levels.

The outputs of the each of the 1-bit correlators 710–716 each controls the "up/down" control signal to a corresponding multi-bit up/down counter 720–726.

The multi-bit up/down counters 720–726 form an integrate and dump. All four up/down counters 720–726 are clocked by a signal (generally, though not necessarily) equal to the system master clock frequency 760 (or some easily-derived derivative thereof). This counter clocking signal is an integer multiple of the symbol rate, resulting in an oversampling of the low digital IF correlation values over the course of the symbol interval. (Ideally, the oversampling ratio will have an integer multiple of 4 relationship to the symbol rate, which reduces the potentially adverse effects of harmonic distortion due to the 1-bit (square wave) nature of the signals.)

Each of these counters 720–726 is enabled by the locally-generated receiver symbol clock SC from the symbol timing recovery module 750, and counts up or down at each "tick" of the clocking signal Fs, depending on the state of the output of the corresponding 1-bit correlator 710–716. Each of the integrate and dump counters 720–726 counts until the end of the symbol period. At the end of the symbol period, the resulting count is latched into an appropriate register, and the absolute value is taken. At the end of a symbol interval, the value in each counter 720–726 represents a signed (positive or negative) number proportional to the degree of correlation between the incoming IF signal and the appropriate locally-generated symbol reference frequency.

A first pair of up/down counters 720, 722 count based on a first In-phase difference between the In-phase output signal output from the first logic-based numerically controlled oscillator 771 and a received signal, and a first Quadrature difference between the Quadrature output signal output from the first logic-based numerically controlled oscillator 771 and the received signal, respectively. A second pair of up/down counters 724, 726 count based on a second In-phase difference between the In-phase output signal output from the second logic-based numerically controlled oscillator 773 and a received signal, and a second Quadrature difference between the Quadrature output signal output from the second logic-based numerically controlled oscillator 773 and the received signal, respectively.

The outputs of the up/down counters 720, 722, 724, 726 are converted to an absolute value prior to addition. A first adder 780 adds the first In-phase difference and the first Quadrature difference. A second adder 730 adds the second In-phase difference and the second Quadrature difference. A magnitude comparator in a module 740 selects a greater one of an output from the first adder 780 and an output from the second adder 730 to provide a demodulated output data signal Rx Data.

In addition to the magnitude comparison, the module 740 also accomplishes other tasks, e.g., output pipelining, transition detection, and output data latching.

FIG. 8 is a more detailed schematic diagram showing an embodiment of the exemplary implementation of the 1-bit precision BFSK demodulator shown in FIG. 7, and in particular showing in more detail the module 740 as well as the symbol timing recovery module 750 shown in FIG. 7.

In particular, the pipeline registers are, e.g., a series of D-type flip/flops (DFF) allowing the determination of early/late conditions to cause an advance or retardation of a locally generated symbol clock, allowing the arrival at the correct symbol timing.

The last DFF of the pipeline register serves as an output latch for the output received data signal Rx Data.

The module 740 also generally allows the ability to determine timing recovery.

Thus, an architecture is provided which, in essence, is a 1-bit precision approximation of an ideal complex correlation demodulator.

It should be noted that, like the companion modulator 100 shown in FIG. 2, the demodulator 200 can easily be extended to M-ary FSK by simply replicating additional NCOs and complex correlators and extending the decision block logic to decode multi-bit symbols.

Simulations and experimental results indicate that a modulator and demodulator in accordance with the principles of the present invention result in an implementation loss of only approximately 1.0–1.5 decibels (dB), relative to the ideal complex correlation demodulator, which is significantly better performance than conventional low cost techniques. These advantages of low-cost, low-complexity, small size, high performance and low-power are significant, particularly in consumer applications. For instance, the modulator and demodulator in accordance with the principles of the present invention have particular application in cordless telephones and other low cost wireless consumer electronics items such as mobile radio, and possibly other applications such as a compact hardware implementation of caller ID data receivers.

The aforementioned modulator relies solely on a bandpass filter 197 at the chosen IF frequency to eliminate both the undesired image resulting from of an internal mixing operation (i.e., in the upconverter 151) in the modulator, as well as other spurious products which result from the discrete-time nature of the IF signal generated by that modulator 151. Such techniques and apparatus work appropriately well in, e.g., 900 MHz cordless phone designs using common IF frequencies and commonly available bandpass filters.

However, in an ever-increasing global economy, it may be desirable for other applications to use different IF frequencies and filters. In such case, it may be difficult to achieve desired adjacent channel protection levels with low cost, largely because practical, inexpensive bandpass filters alone may be unable to adequately reject the undesired image product at those other IF frequencies and mixing product spacings.

Figure 9:
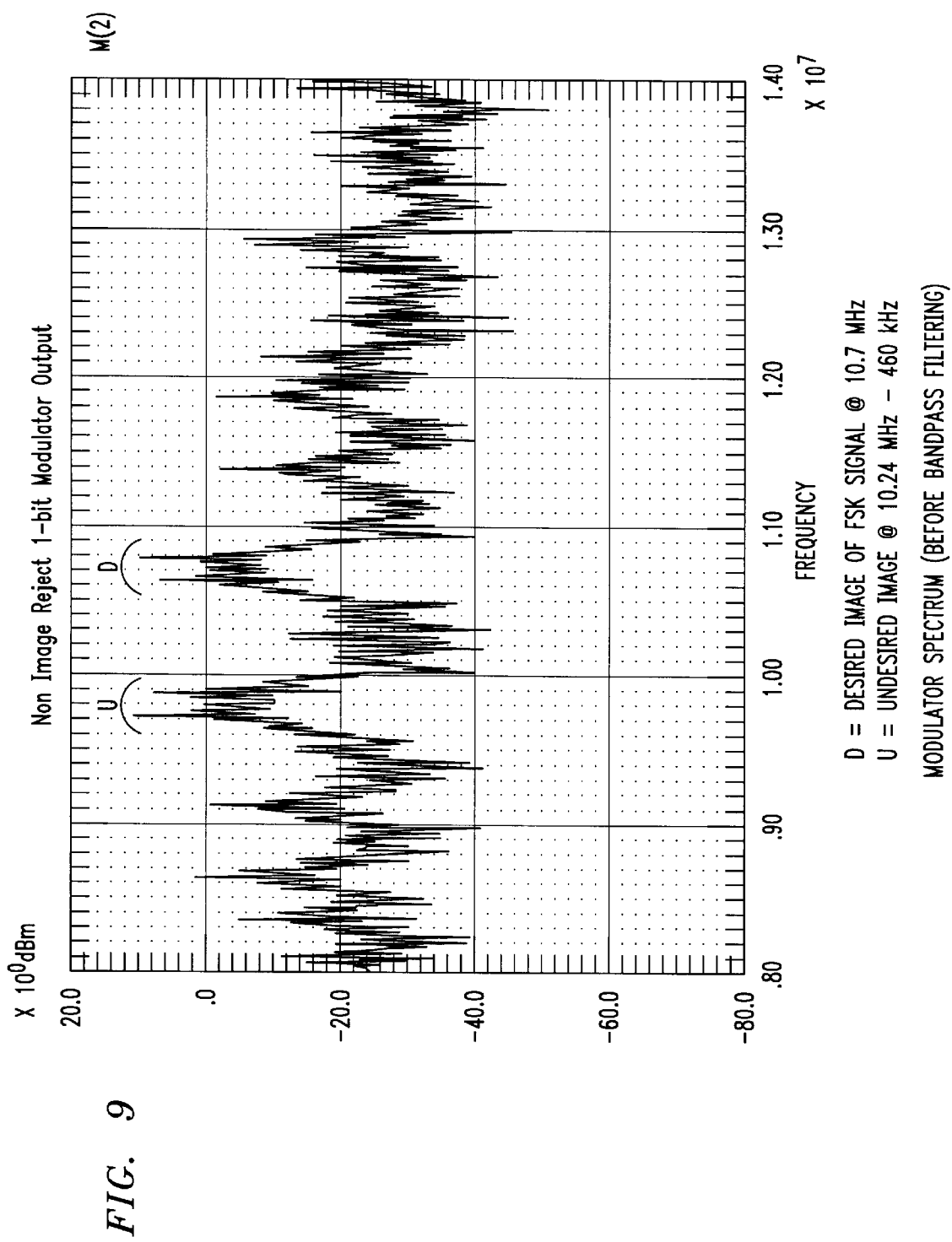
FIG. 9 shows the spectrum at the output of the upconverter 151 of the FSK modulator 100 shown in FIGS. 2 and 3 before bandpass filtering.

The embodiment of the FSK modulator shown in FIG. 9 utilizes the discovery, given the disclosed logic-based modulator/demodulator techniques, of the feasibility of employing image reject techniques at the 1-bit level with the addition of only a very small number of logic elements. Using such image rejection techniques, the undesired portion of the image product resulting from upconversion (which is the most difficult undesired spurious product for a typical bandpass filter to reject) may be suppressed, e.g., by approximately an additional 30 dB. This suppression of the undesired portion of the output spectrum both improves performance and reduces the requirements (and thus the cost of) the external bandpass filter(s) 197.

Image Rejection of Undesirable Portion of TxIF signal

In accordance with another aspect of the invention, another embodiment of an FSK modulator architecture shown and described with respect to FIGS. 9 to 16 expands on the FSK modulator 100 shown in FIGS. 1–3 by incorporating image reject techniques, resulting in improved performance and lower system cost.

In particular, the 1-bit FSK modulator 100 of FIGS. 1–3 employs a 1-bit precision (square wave, logic level) numerically controlled oscillator (NCO) to generate an FSK signal at a conceptual carrier frequency, plus and minus the desired FSK shift. In the given example, the conceptual carrier frequency is 460 kHz and the FSK tone spacing is 160 kHz, providing "mark" and "space" frequencies at 380 kHz and 540 KHz, respectively. This 460 KHz "low digital IF" is then up-converted to a higher IF frequency (e.g., to 10.7 MHz) by exclusive NORing (XNOR) the 460 KHz low digital IF with the master clock signal (e.g., 10.240 MHz).

In this embodiment, the in-phase component I of a low digital IF signal (i.e., output from an NCO) is mixed with an orthogonal phase (i.e., the quadrature phase Q) of the master clock signal MCLK. Also, the Q phase of the low digital IF signal is mixed with the I phase of the master clock signal MCLK. The mixer in the disclosed embodiment functions as a 1-bit multiplier, and is comprised of exclusive OR (XOR) or exclusive NOR (XNOR) gate logic. (In the case of a 10.7

MHz IF, the low digital IF signal is 460 KHz+/− the FSK shift, and the master clock signal MCLK is 10.24 MHz.)

The outputs of the two mixers (e.g., XOR or XNOR logic), are summed with, e.g., NAND logic. As a result, one set of sidebands (in the given example the lower sidebands) are 180° out of phase and cancel, while the other set of sidebands are in-phase and add constructively, accomplishing image rejection in accordance with the principles of the present invention.

Figure 10:
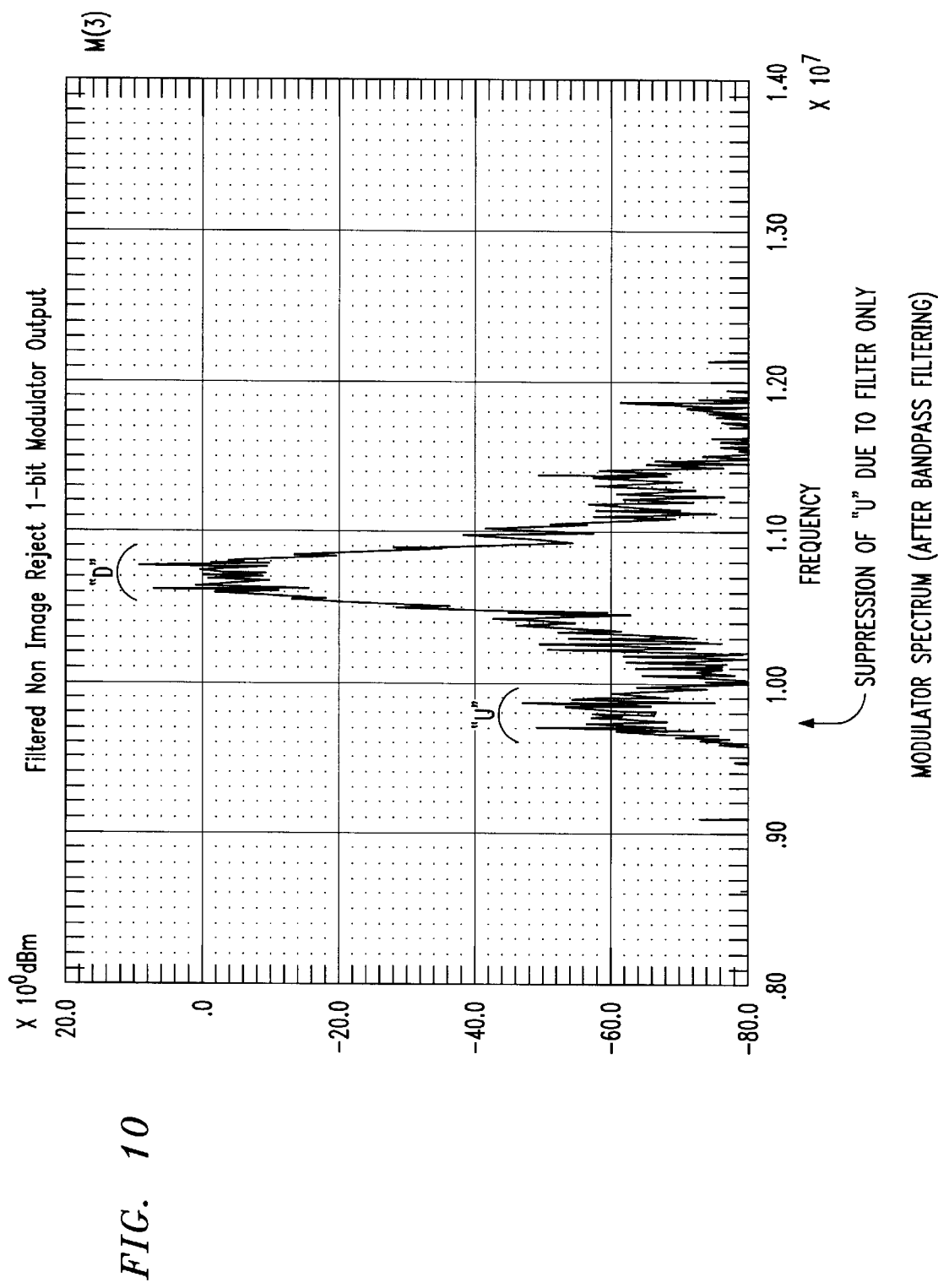
FIG. 10 shows the expected result of bandpass filtering with an appropriate bandpass filter 197 at the desired product frequency of, e.g., 10.7 MHz, in the FSK modulator shown in FIGS. 2 and 3.

FIG. 9 shows the spectrum at the output of the upconverter 151 of the FSK modulator 100 shown in FIGS. 2 and 3 before bandpass filtering, and FIG. 10 shows the expected result of bandpass filtering with an appropriate bandpass filter 197 at the desired product frequency of, e.g., 10.7 MHz. In FIGS. 9 and 10, the label "U" refers to the undesirable portion of the output signal (e.g., at 10.24 MHz−460 KHz=9.78 MHz), and the label "D" refers to the desirable portion of the output signal (e.g., at 10.7 MHz).

The technique shown in FIGS. 1–3 relies on the 10.7 MHz bandpass filter to reject the undesired difference product centered at, e.g., 10.240 MHz−460 kHz=9.780 MHz. Of course, as explained, the disclosed modulator and demodulator techniques and architectures are highly programmable, making it possible to implement other combinations of NCO frequencies and master clock frequencies to generate and detect different IF frequencies, FSK tone spacings, and/or symbol rates.

This approach works well, at least with the given exemplary choices of IF frequencies and ceramic bandpass filters conventionally available at 10.7 MHz, as long as the application does not require more suppression of the undesired image product than the bandpass filter 197 can provide.

In some instances, it may be impractical or otherwise undesirable to rely solely on the external bandpass filter 197 to provide all of the required rejection of the unwanted image product in the modulated signal. This is largely because of factors such as the intermediate frequency (IF), filter shape factor, percentage bandwidth, number of sections in the filter, etc., all of which play into the cost of the bandpass filter 197.

Figure 11:
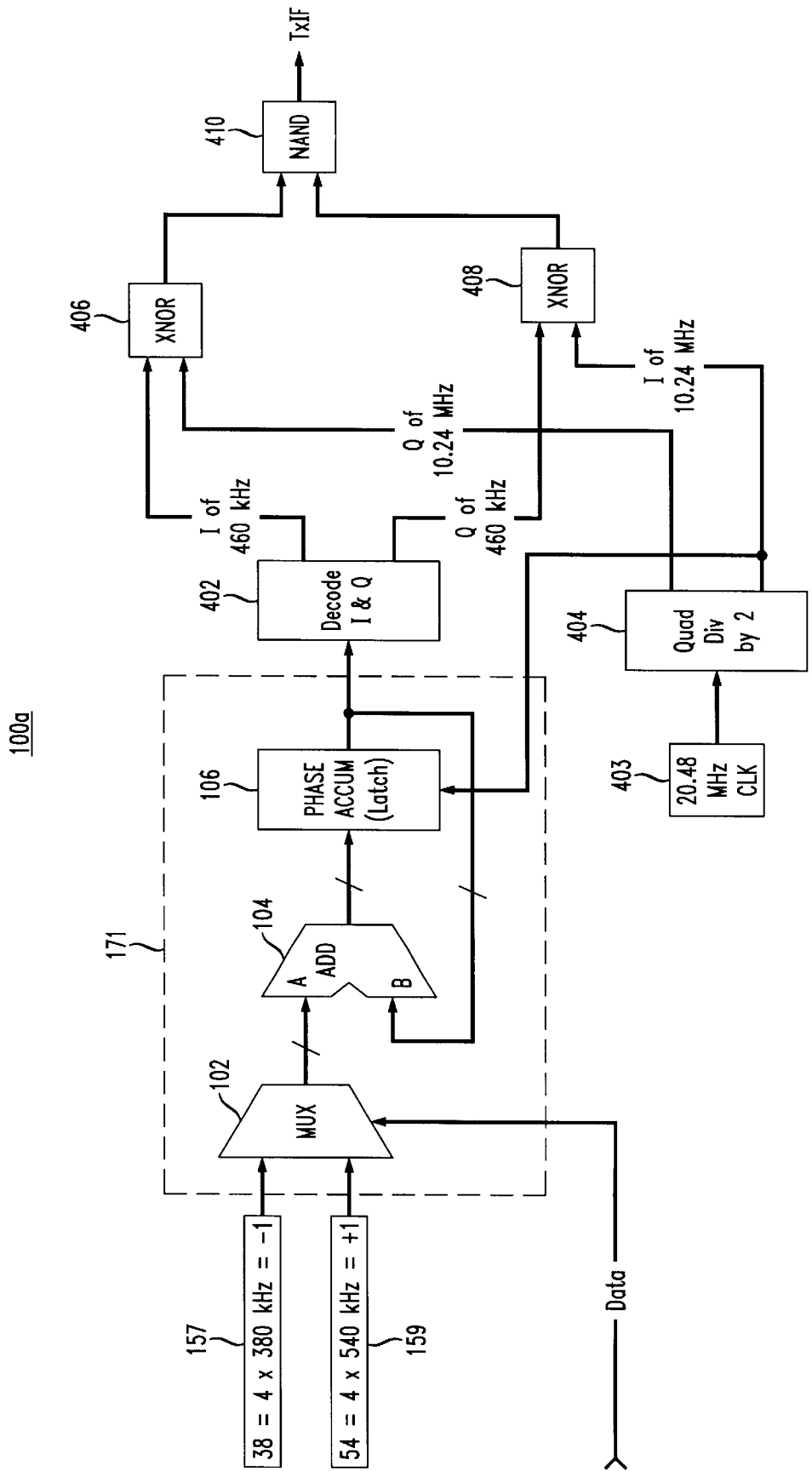
FIG. 11 shows a simplified block diagram of another embodiment of a 1-bit precision BFSK modulator having image rejection at 1-bit (logic level) using, e.g., a 10.7 MHz IF with low IF of 460 kHz.

FIG. 11 shows a simplified block diagram of another embodiment of a 1-bit precision BFSK modulator having image rejection at 1-bit (logic level) using, e.g., a 10.7 MHz IF with low IF of 460 kHz.

In particular, the FSK modulator 100a shown in FIG. 11 provides enhanced performance by employing image rejection techniques at 1-bit logic level precision. The image rejection technique adds a very small amount of complexity to the modulator shown in FIGS. 2 and 3, with negligible impact on chip size and cost.

In FIG. 11, the FSK modulator 100a includes local frequency values 157, 159, a multiplexer 102, a numerically controlled oscillator (NCO) 171 substantially as shown and described with respect to the first embodiment of an FSK modulator 100 shown in FIGS. 2 and 3.

An In-phase (I) and Quadrature phase (Q) decoder 402 decodes the output from the NCO 171 into an I output signal of the lower IF of, e.g., 460 KHz, and a Q output signal of the lower IF. A quadrature divide by 2 module 404 divides the system clock 403 into a Q output signal of 10.24 MHz and an I output signal of 10.24 MHz.

The I output signal of the lower IF is upconverted by the Q output signal of 10.24 MHz using an XNOR module 406, and the Q output signal of the lower IF is upconverted by the I output signal of 10.24 MHz using another XNOR module 408.

Importantly, the image rejection or suppression in accordance with this aspect of the present invention is finalized by NANDing the upconverted I output signal from the XNOR module 406 with the upconverted Q output signal from the XNOR module 408 using a NAND module 410, to provide the modulated, transmit signal TxIF.

If desired, appropriate switching and/or gating elements may be implemented in the In-phase and Quadrature signal paths driving the XNOR upconverter "mixers" 406, 408 in such a manner as to provide the ability to select either the upper or lower sideband product, rejecting the other unselected sideband product under either hardware or software control.

Figure 12:
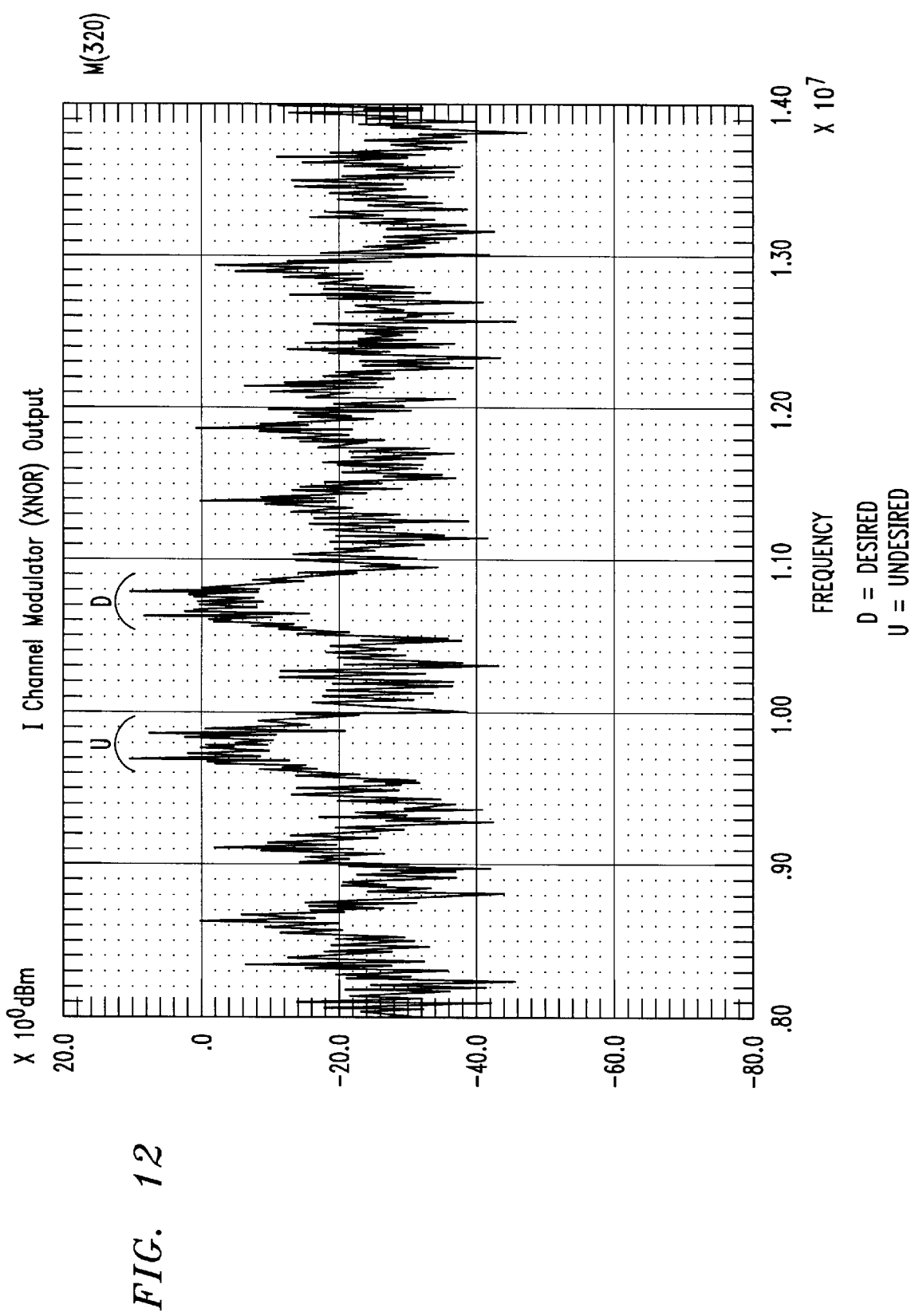
FIGS. 12 and 13 show simulation plots of the spectrums of the signals output from the In-phase and Quadrature channel upconverter XNOR elements shown in FIG. 11.
Figure 13:
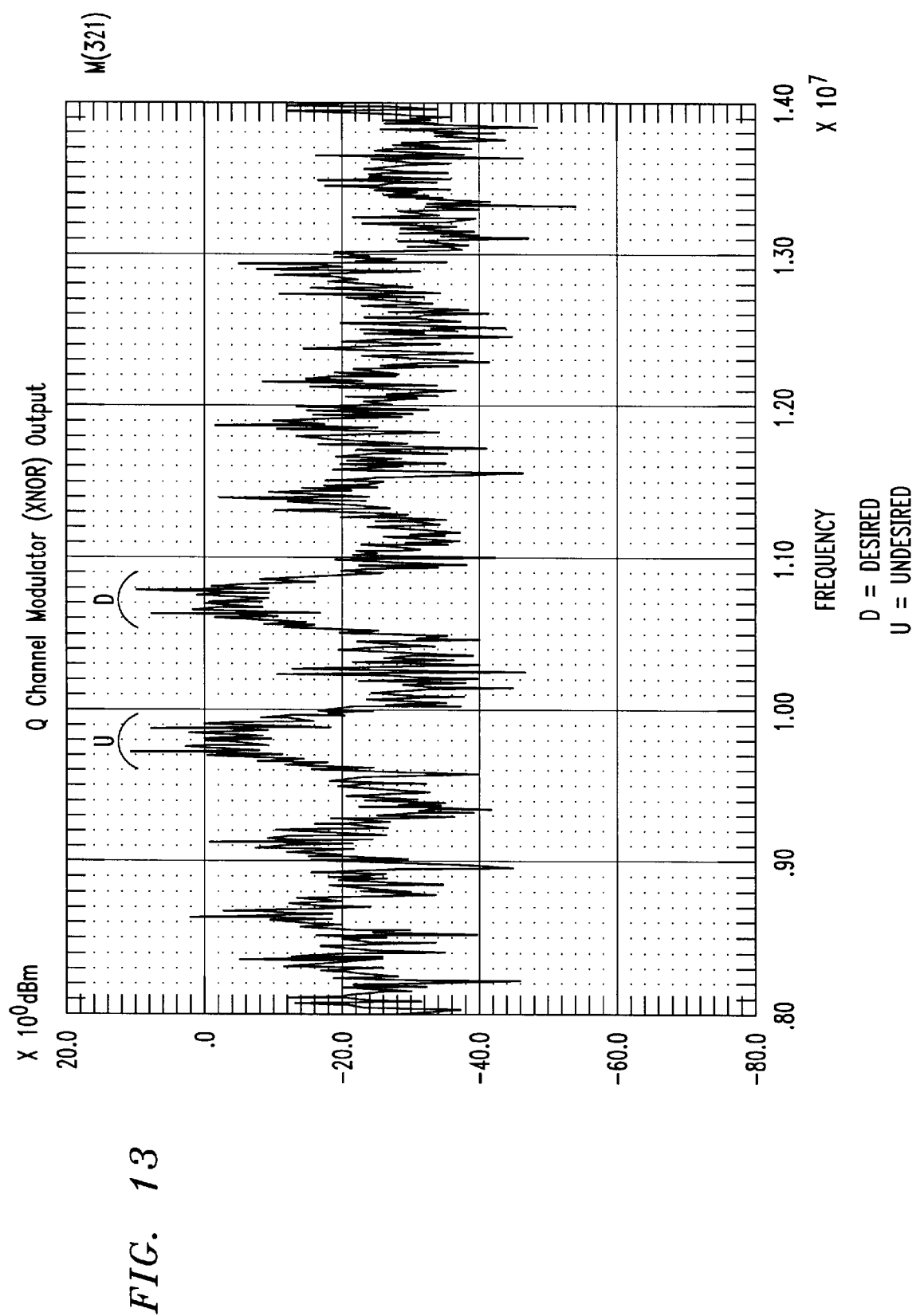

To show the dramatic effects of the image rejection, FIGS. 12 and 13 show simulation plots of the spectrums of the signals output from the In-phase and Quadrature channel upconverter XNOR elements 406, 408, respectively. Note the substantial similarity of each of FIG. 12 and 13 to the output spectrum of FIG. 2's modulator 100, shown in FIG. 9. The output signal shown in FIG. 12 is NANDed with the output signal shown in FIG. 13, to arrive at the image rejected, suppressed TxIF output signal shown in FIG. 14.

Figure 14:
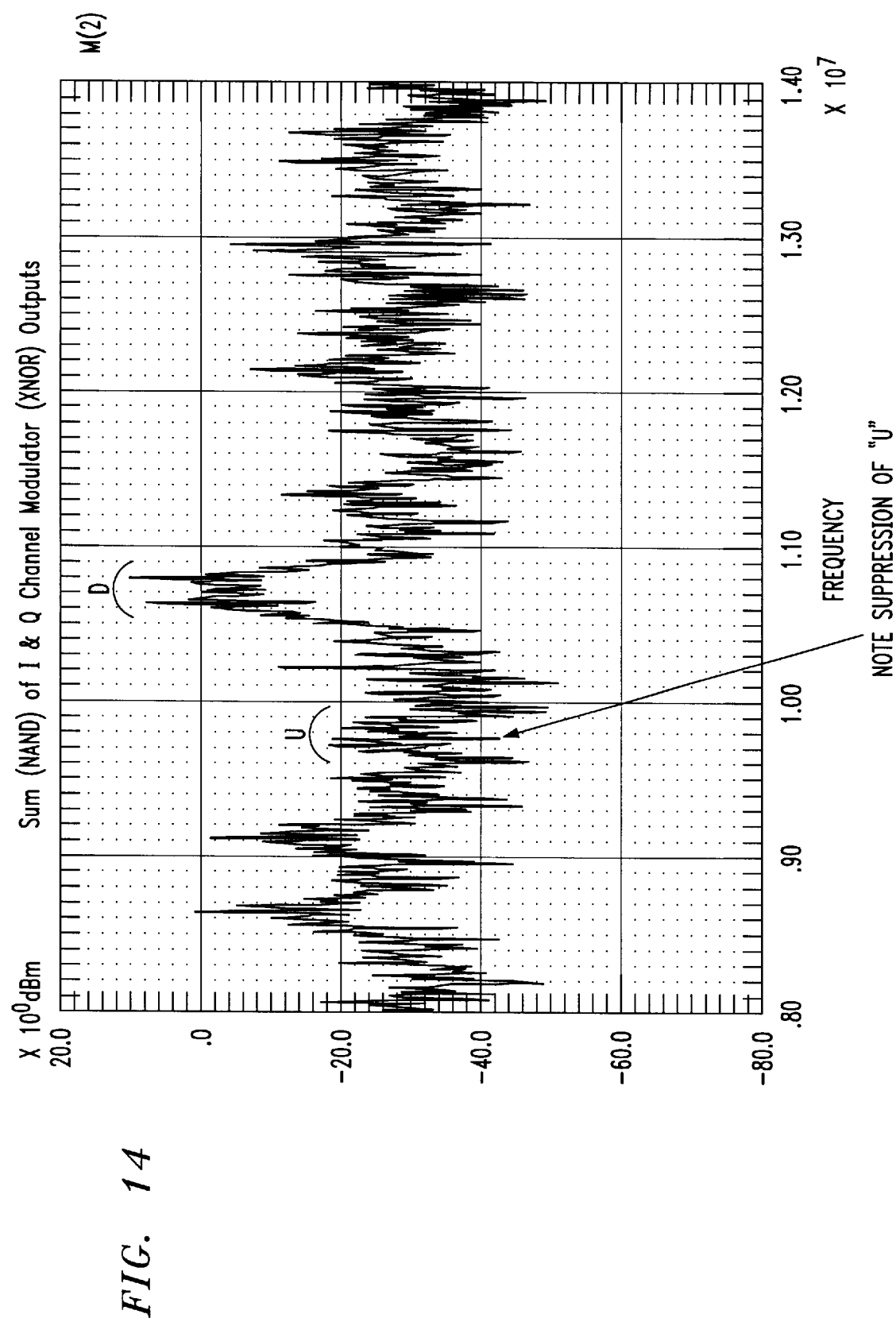
FIG. 14 shows the simulation plot of the spectrum of the output signal which results from NANDing the outputs of the In-phase and Quadrature upconverter XNOR modules shown in FIG. 11.

In particular, FIG. 14 shows the simulation plot of the spectrum of the output signal which results from NANDing ("summing") with the NAND module 410 the outputs of the In-phase and Quadrature upconverter XNOR modules 406, 408. Note that the undesired image product (in this case the lower sideband at 10.240 MHz−460 kHz) is significantly suppressed, in this case by approximately 30 dBm.

Figure 15:
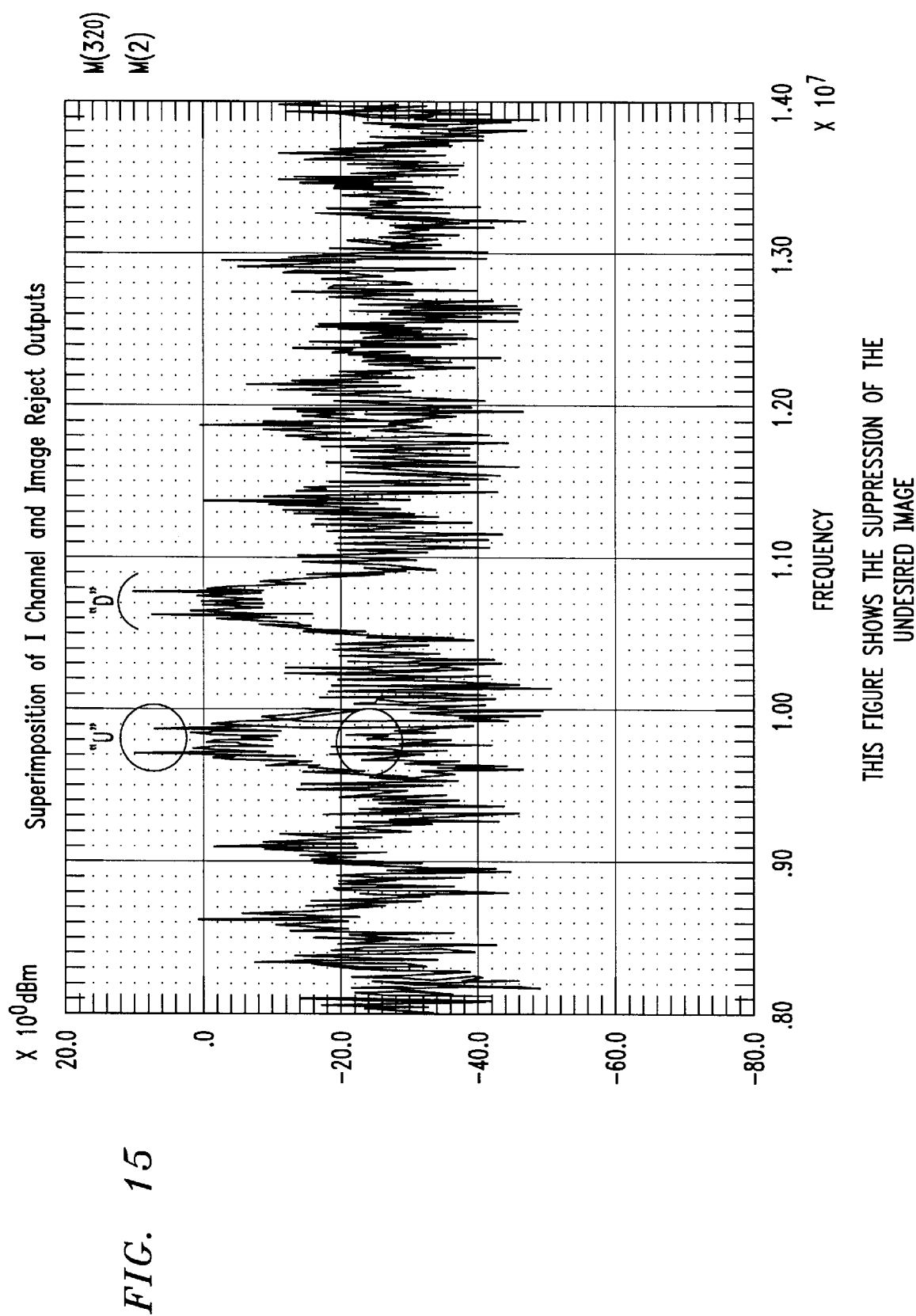
FIG. 15 shows a superimposition of the spectrum plots of FIGS. 12 and 14, emphasizing the 30 dBm suppression of the undesirable output using image rejection in accordance with this aspect of the present invention.

FIG. 15 shows a superimposition of the spectrum plots of FIGS. 12 and 14, emphasizing the 30 dBm suppression of the undesirable output using image rejection in accordance with this aspect of the present invention.

The bandpass filtering, e.g., using the bandpass filter 197 shown in FIGS. 2 and 3, may be used in conjunction with the image rejection apparatus and technique shown in FIG. 11.

Figure 16:
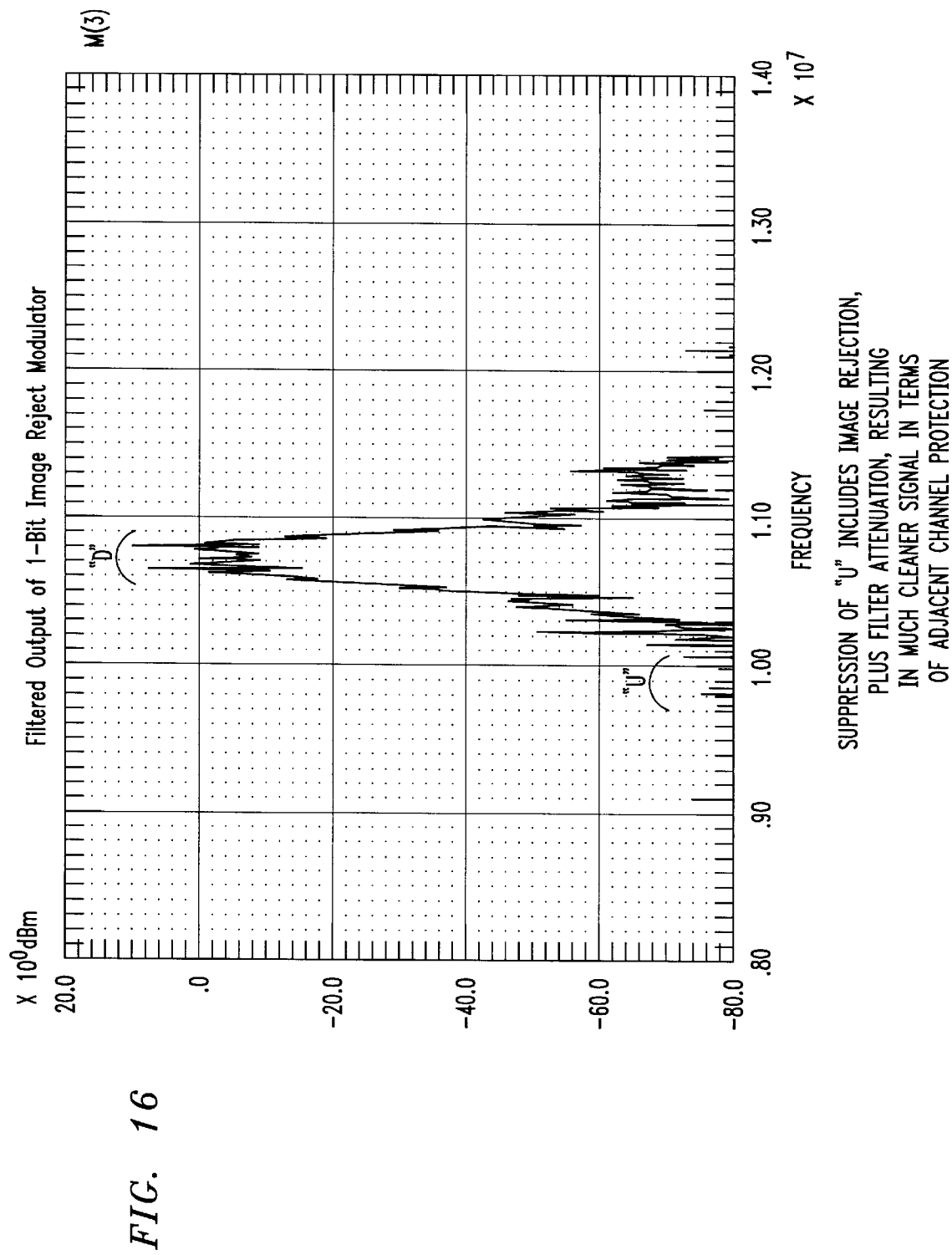
FIG. 16 shows the output of the image reject modulator when filtered by an appropriate bandpass filter, in addition to the image rejection technique shown in FIG. 11.

For instance, FIG. 16 shows the output of the image reject modulator when filtered by an appropriate bandpass filter, (e.g., bandpass filter 197 shown in FIGS. 2 and 3) in addition to the image rejection technique shown in FIG. 11. Note the virtual absence of the undesired image product in FIG. 16 due to the additional suppression (e.g., approximately 30 dBm in the given example) provided by the use of the image reject technique in accordance with the principles of the present invention.

Thus, the image rejection technique for use in a logic-based FSK modulator (e.g., a BFSK modulator) in accordance with this aspect of the present invention provides additional suppression from undesired portions of the output spectrum, as well as the attendant possibility of cost reductions based on more abundant and standard bandpass filters.

Modulator Harmonic Aliasing and Demodulator Subsampling

The embodiment shown in FIGS. 2 and 3 outlines a technique and architecture which provides the ability to implement an entire FSK radio modem at a relatively low IF, e.g., 10.7 MHz. This embodiment (and the other embodiments) have current commercial application in cordless telephones and other low cost wireless consumer electronics items, e.g., mobile radio.

The next embodiment relates to a technique and apparatus for using the 1-bit precision FSK modulator/demodulator architecture shown and described with reference to FIGS. 2 and 3 to generate and detect FSK waveforms at much higher IF frequencies without the need for upconversion beyond that provided by the logic-based upconverter 151.

This technique can provide the ability to obtain substantial improvements in image rejection, transmitter spurious products, etc. without the need for the use of image reject mixer techniques in the up and down converters of the companion RF integrated circuit.

A 1-bit precision Harmonic Alias Direct IF Modulator 100 in accordance with this aspect of the present invention is virtually identical to that shown and described with reference to FIGS. 2 and 3, with the exception that the bandpass filter 197 is changed. instead of bandpass filtering to the fundamental signal, a much higher frequency bandpass filter 197 is instead used to select a high IF frequency alias of the fundamental signal.

In particular, the FSK modulator 100 shown in FIGS. 2 and 3 employs the fundamental output of a discrete-time, logic level FSK signal generated by the upconverter 151, and selection of that fundamental signal with a bandpass filter 197, having a bandpass frequency that rejects essentially all other spectral components of the modulator's transmit output signal TxIF.

This 1-bit precision Harmonic Alias direct IF modulator embodiment extends the use, application, and utility of the same hardware by recognizing the fact that, because of the discrete-time nature of the transmit output signal TxIF generated by the FSK modulator, copies or harmonic aliases of the desired FSK signal exist in the signal output by the logic-based upconverter 151 in proximity to all of the harmonics of the master clock.

Because the transmit output signal TxIF signal has a logic level swing, it is effectively "hard-limited". Thus, the additional copies or harmonic aliases of the fundamental signal are not suppressed to a significant degree at the transmit output signal TxIF.

The BFSK modulated, transmit output signal TxIF output of the FSK modulators in accordance with the principles of the present invention are fast-rise-time, square wave, logic level, double-sideband signals. For instance, in the given example, the BFSK modulated transmit output signal TxIF is centered at 10.24 MHz with FSK modulated sidebands located at+/− the (programmable) low digital IF. The FSK modulation is generated by a 1-bit precision NCO.

Because of the 1-bit precision (square wave), sampled nature of the upconversion process performed by the upconverter 151, the transmit output signal TxIF has the characteristics of a discrete-time signal in that identical copies or "harmonic aliases" of the desired FSK signal appear symmetrically about all of the odd harmonics of the master clock, e.g., about 10.24 MHz, spaced by the low IF frequency from those harmonics, well into the UHF region.

Accordingly, the (normally dominant) fundamental signal can be suppressed substantially with a suitable bandpass filter 197 selected to pass a frequency band at a higher IF frequency, i.e., at the frequency of one of the harmonic aliases. Thus, a high IF frequency bandpass filter 197 may be used to select a particular copy of the FSK signal which resides at the desired IF frequency, rejecting other frequencies.

The only apparent caveat in the use of this technique is that it may be necessary to provide somewhat more gain in the upconverter path due to the slightly lower level of the harmonic alias relative to the fundamental signal. However, this small drawback is not significant, nor does it present a technical risk or cost impact to most applications.

This "direct IF" technique for replacing the need for additional upconversion to a high IF can be implemented well into the VHF range. For instance, the direct IF technique can be implemented in 900 and/or 1900 MHz cordless telephone application using high Ifs of, e.g., 276 MHz or 400 MHz, among others.

1-bit Harmonic Alias Direct IF Demodulator

To utilize the Direct IF technique, the demodulator 200 is as shown in FIGS. 7 and 8, with the exception that the digital downconverter (D-FF stages) 762 are clocked by a clock 760 having a much lower frequency relative to the IF frequency shown in FIG. 7, e.g., 10.24 MHz. This results in the (hard-limited, band-limited) IF signal at the much higher IF being sub-sampled by the digital downconverter 762. However, the resultant output is an alias at the intended low digital IF.

The correlators 710–716 still operate at the low digital IF, and the oversampling ratio of the integrate and dump blocks 720–726 are still the same. This is because the oversampling ratio is keyed to the ratio of the master clock 760 and the symbol rate SC, not to the IF frequency.

The remainder of the demodulator 200 operates in an identical manner as shown and described with respect to FIGS. 7 and 8 (so long as the IF signal input to the demodulator 200 is of sufficient magnitude to toggle the self-biasing input comparator 764.

The capability of the demodulator 200 is limited to the frequency of high IF frequency which the mixer (DFF) 762 can handle. For instance, in one embodiment the DFF 762 was limited to about 150 MHz. Using frequencies above about 150 MHz, the use of an external harmonic sampling mixer may be required, e.g., in a companion RF integrated circuit. The external harmonic sampling mixer preferably converts from the high IF frequency, e.g., 276 MHz, directly to the desired low IF frequency, e.g., 480 KHz (for a master clock of 10.24 MHz and a $1^{st}$ IF of 276 MHz). Preferably, suitable low pass filtering and hard limiting are used in addition to the external harmonic sampling mixer.

Figure 17:
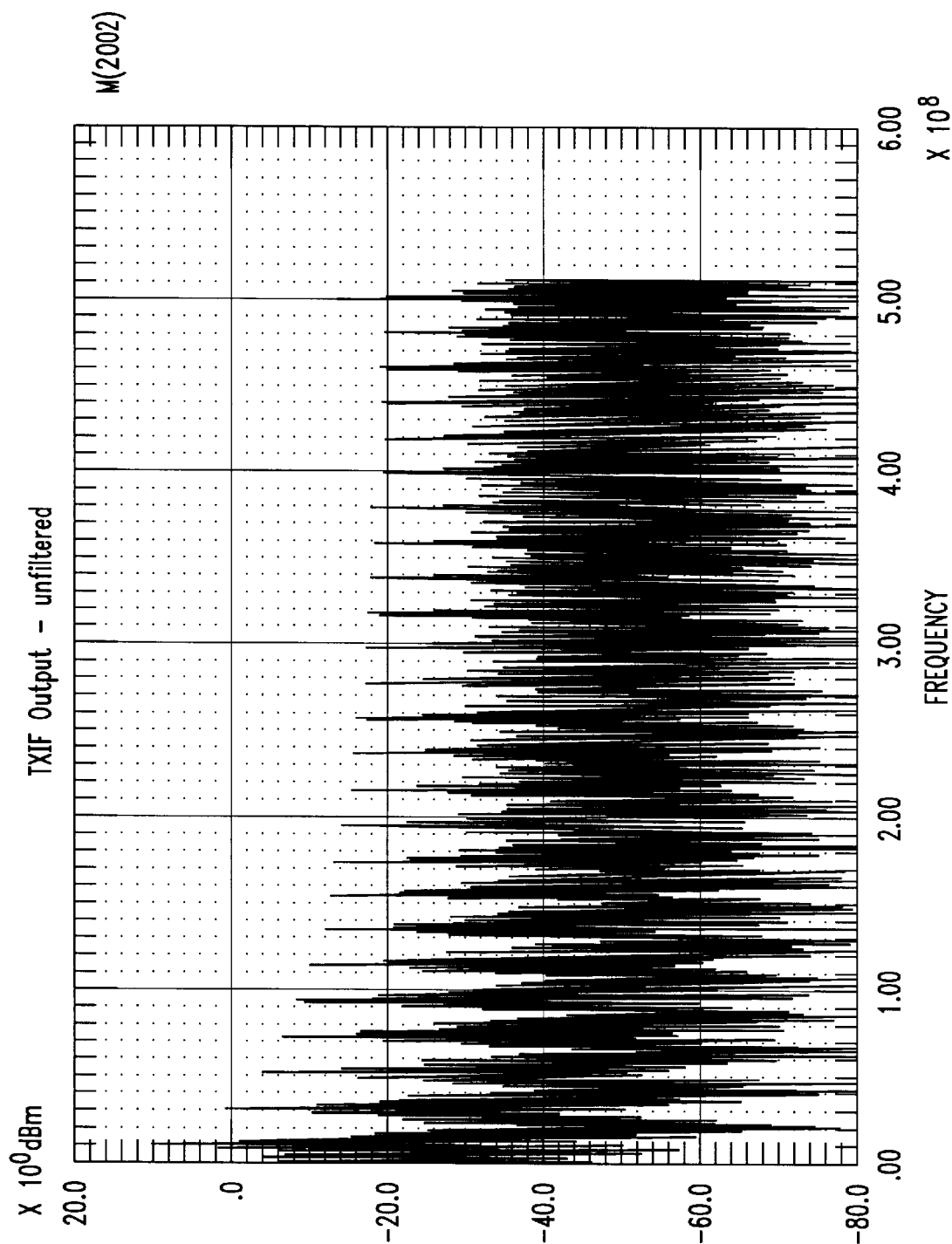
FIG. 17 shows a broadband spectrum analysis up to 512 MHz of the expected unfiltered transmit output signal TxIF of the modulator shown in FIGS. 2 and 3.

For further explanation, FIG. 17 shows a broadband spectrum analysis up to 512 MHz of the expected unfiltered transmit output signal TxIF of the modulator 100 shown in FIGS. 2 and 3.

In FIG. 17, each of the major "peaks" is actually a copy of the "fundamental" signal. The fundamental signal is a double sideband product of the carrier signal, e.g., 10.24 MHz+/− an FSK signal with a center frequency of 480 KHz. (Note that this example relates to a center frequency of 480 KHz, not 460 KHz as in previous embodiments.) Because of the square wave nature of the fundamental signal, the aliased copies are much stronger at the odd harmonics of the master clock, e.g., 10.24 MHz.

It is appreciated in this aspect of the present invention that the relatively high level of the fundamental signal (e.g., a logic-level swing at, e.g., about 3V p—p) coupled with the roll off characteristic of the spectra of such square wave signals, results in even the rather higher order aliases (at least up to 400 MHz) being respectable signals in their own right. The present invention utilizes the harmonic aliases directly at a desired intermediate frequency (IF) without requiring an upconversion to arrive at the IF. The conceptual center frequency of the signal output from the NCO 171 may be adjusted to cause a harmonic alias to be centered about a desired IF frequency. Thus, in the present example, the adjustment of the conceptual center frequency from 460 KHz as in the embodiments in FIGS. 1–16, to a conceptual center frequency of 480 KHz in the present embodiment replacing an upconverter with the direct use of a suitable harmonic alias.

For example, suitable bandpass filters are commercially available at 276 MHz. Thus, 276 MHz is selected as a desirable IF frequency in the present example. For example, standard GSM SAW filters having suitable bandwidths and selectivity are commercially available in high volumes at that frequency, resulting in low filter cost. With a low digital IF of 480 KHz, mixed to a 10.24 MHz master clock, the resulting level of the usable alias centered at 276 MHz is approximately −20 dBm.

It is noted that the spectrally local signal-to-noise ratio (SNR) of the selected harmonic alias is essentially identical to that of the fundamental signal. It should also be recognized that the modulation characteristics of the harmonic aliases are essentially identical to those of the fundamental signal, since these signals are produced by a discrete-time sampled signal aliasing mechanism, not by frequency multiplication, which would alter the modulation index.

In accordance with the principles of the present invention, any convenient harmonic alias (e.g., on a basis of matching to a suitable, high-volume, low cost SAW filter or other criteria) can be selected by suitably selective bandpass filtering and treated directly as a "high IF" signal, eliminating an additional upconversion step to a high IF in a continuous phase frequency shift keyed modulator. Elimination of the high IF upconverter also eliminates the associated local oscillator source required to clock the upconverter, further reducing costs. Master clock frequency and "low digital IF" frequencies can also be altered to arrange for an alias to arrive at a desired high IF frequency.

FIGS. 18–29 show the results of simulations designed to evaluate the filtering requirements for the case where the high IF is 276 MHz, based on several variables including pre-filtering of the TxIF output signal with a 2 pole highpass filter with a 3 dB cutoff frequency of 250 MHz, with a 2 pole bandpass filter with a 20 MHz passband, and with a 2 pole bandpass filter with a 30 MHz passband. Each of these pre-filtering cases is further evaluated with the primary SAW IF filter modeled with stopband rejections of 45 dB, 55 dB, and 65 dB, in order to evaluate the range of SAW performance from the "typical" specification of 65 dB stopband attenuation to the "worst case" (guaranteed) stopband attenuation of 45 dB.

Figure 18:
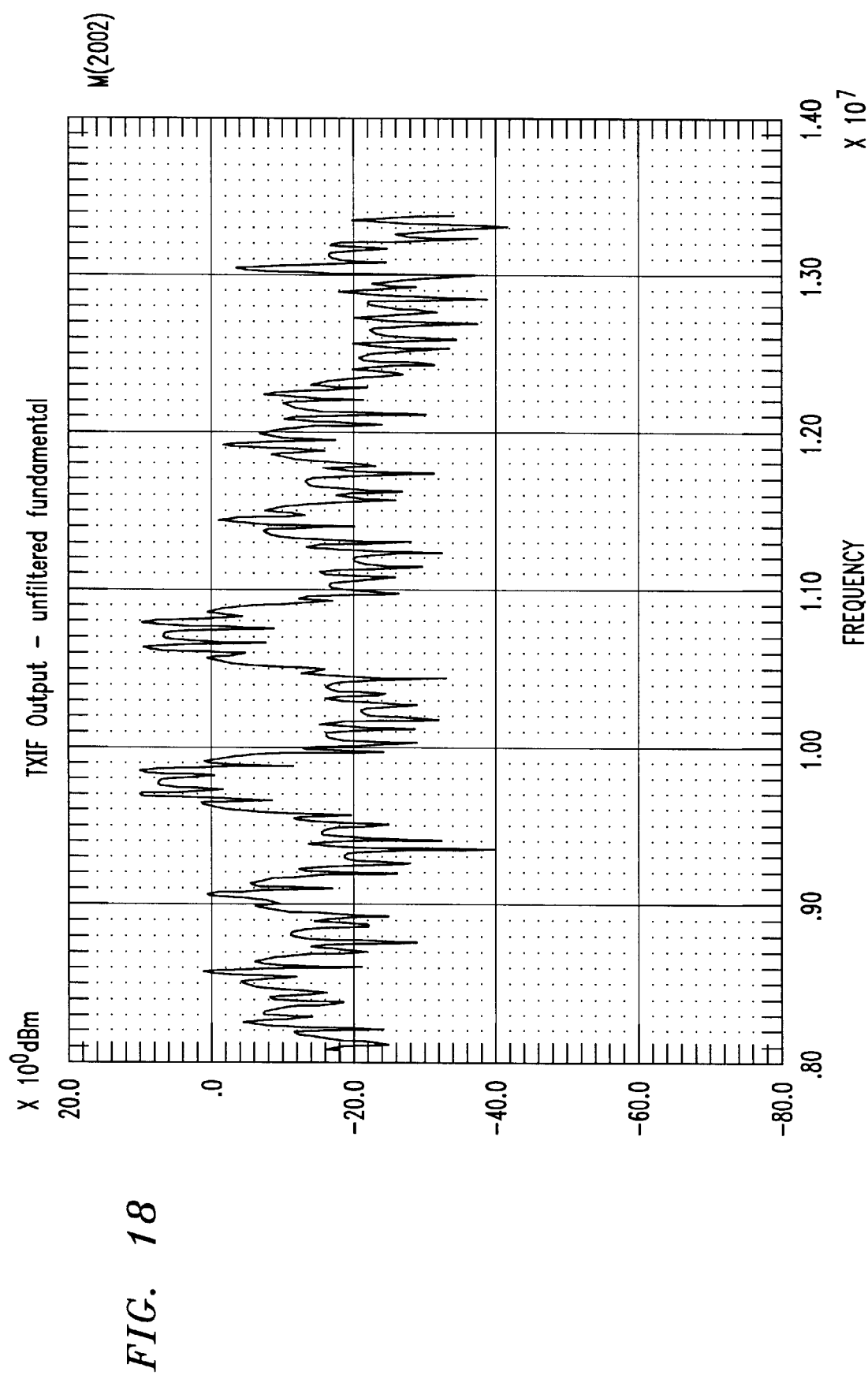
FIGS. 18–29 show the broadband spectrum of the (simulated) TxIF output (without any filtering), a "zoomed-in" -view of the double sideband fundamental, and a "zoomed-in" view of a pair of harmonic aliases, one of which has been arranged to fall precisely at a standard 276 MHz IF frequency for the reasons described above, by simply programming the low digital IF NCO to generate an FSK signal centered at 480 KHz.

In particular, FIG. 18 shows a zoomed in view of the unfiltered fundamental signal at 10.24 MHz+/−480 KHz.

Figure 19:
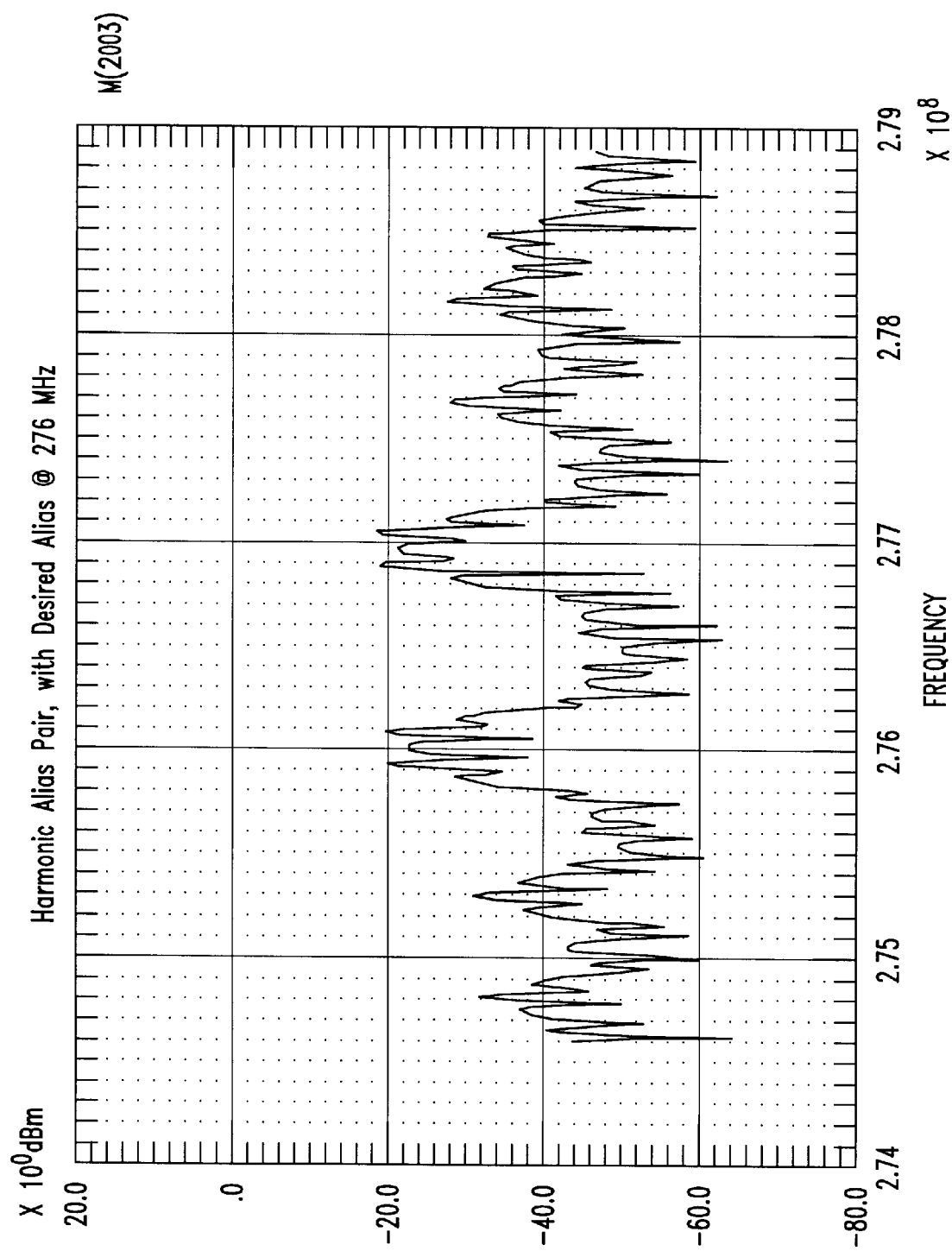

FIG. 19 shows a zoomed in view of the lower sideband alias at 276 MHz [(27×10.24 MHz)−480 KHz], and its companion at 480 KHz above the $27^{th}$ harmonic alias of 10.24 MHz.

Figure 20:
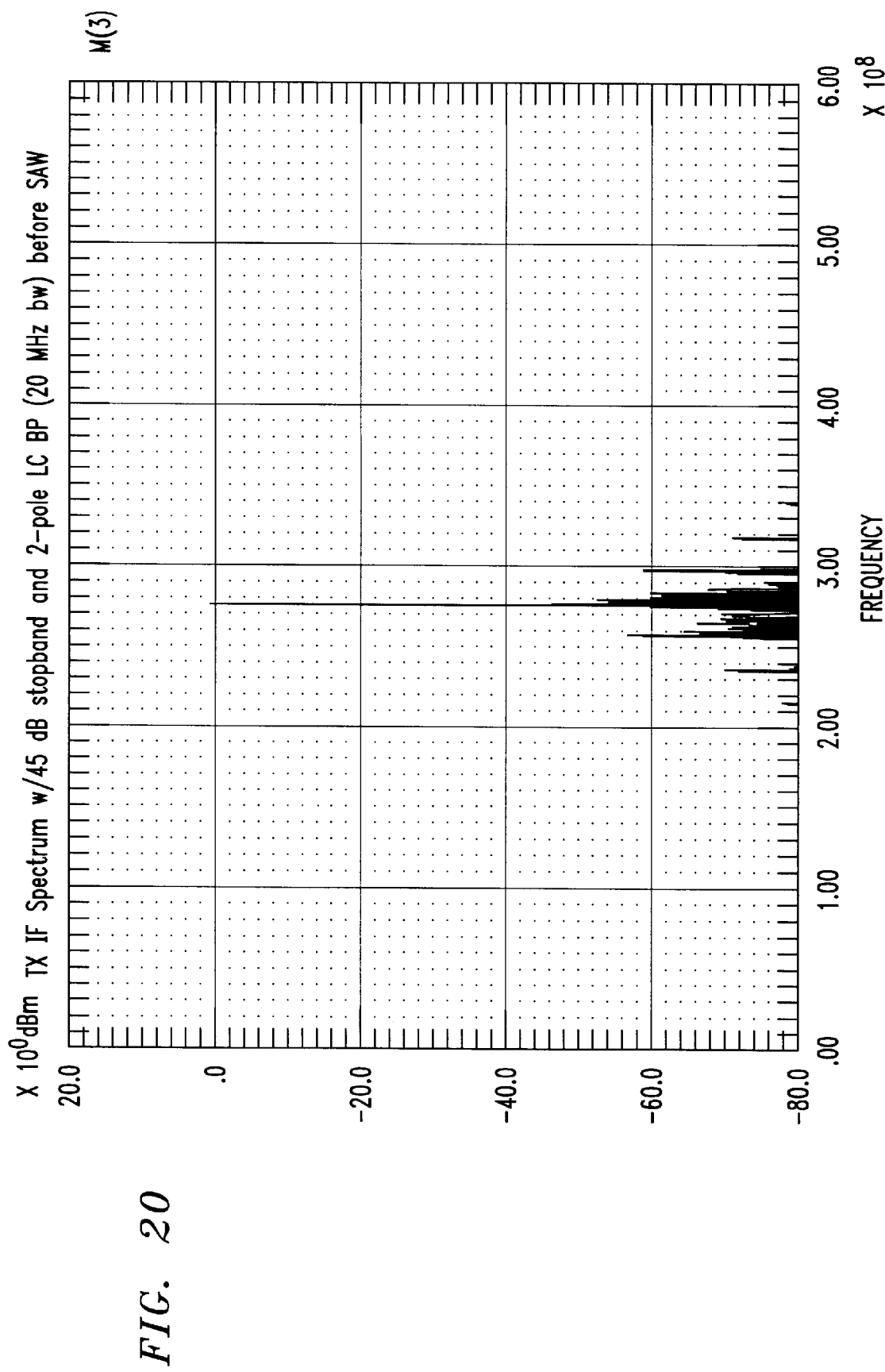
Figure 21:
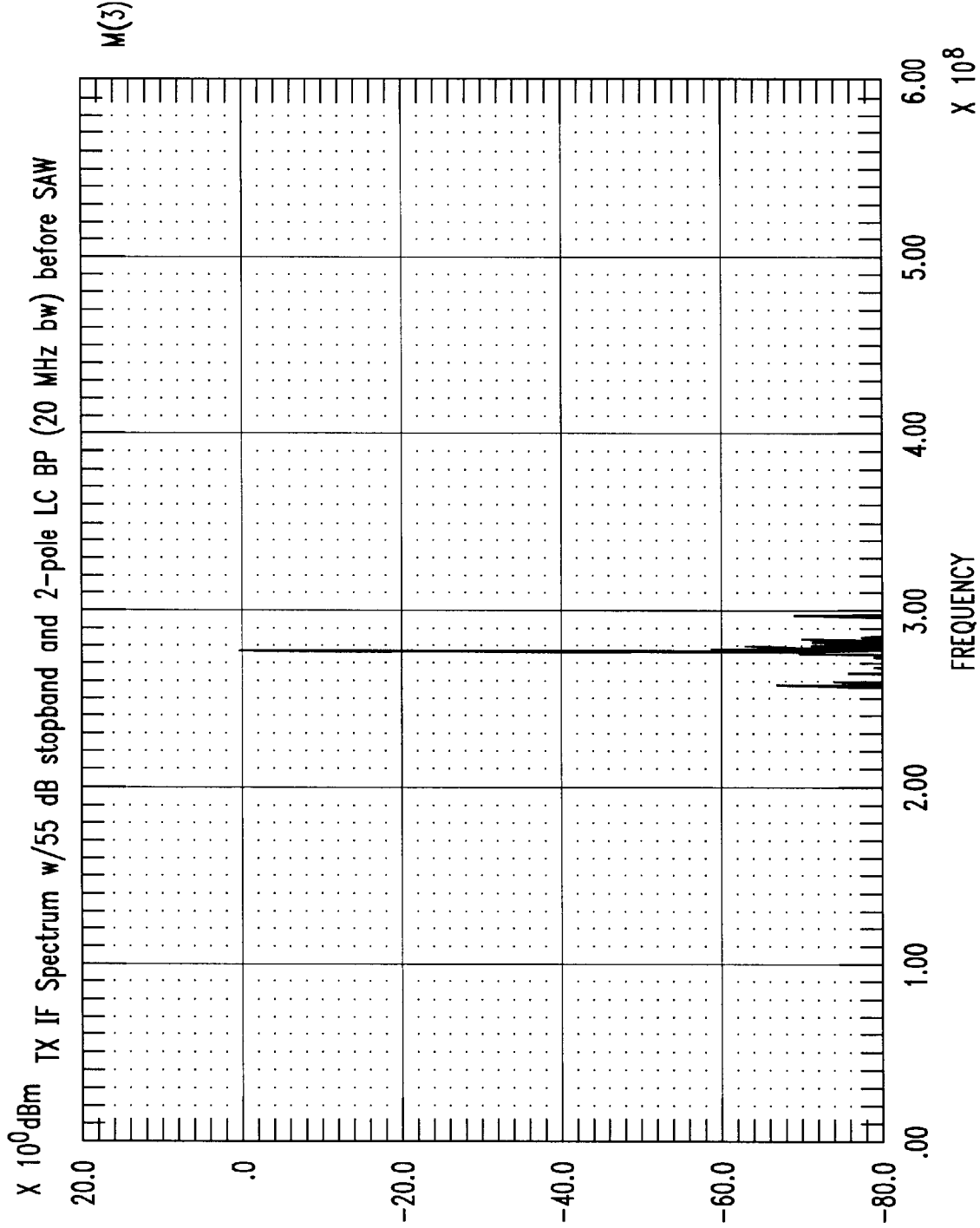
Figure 22:
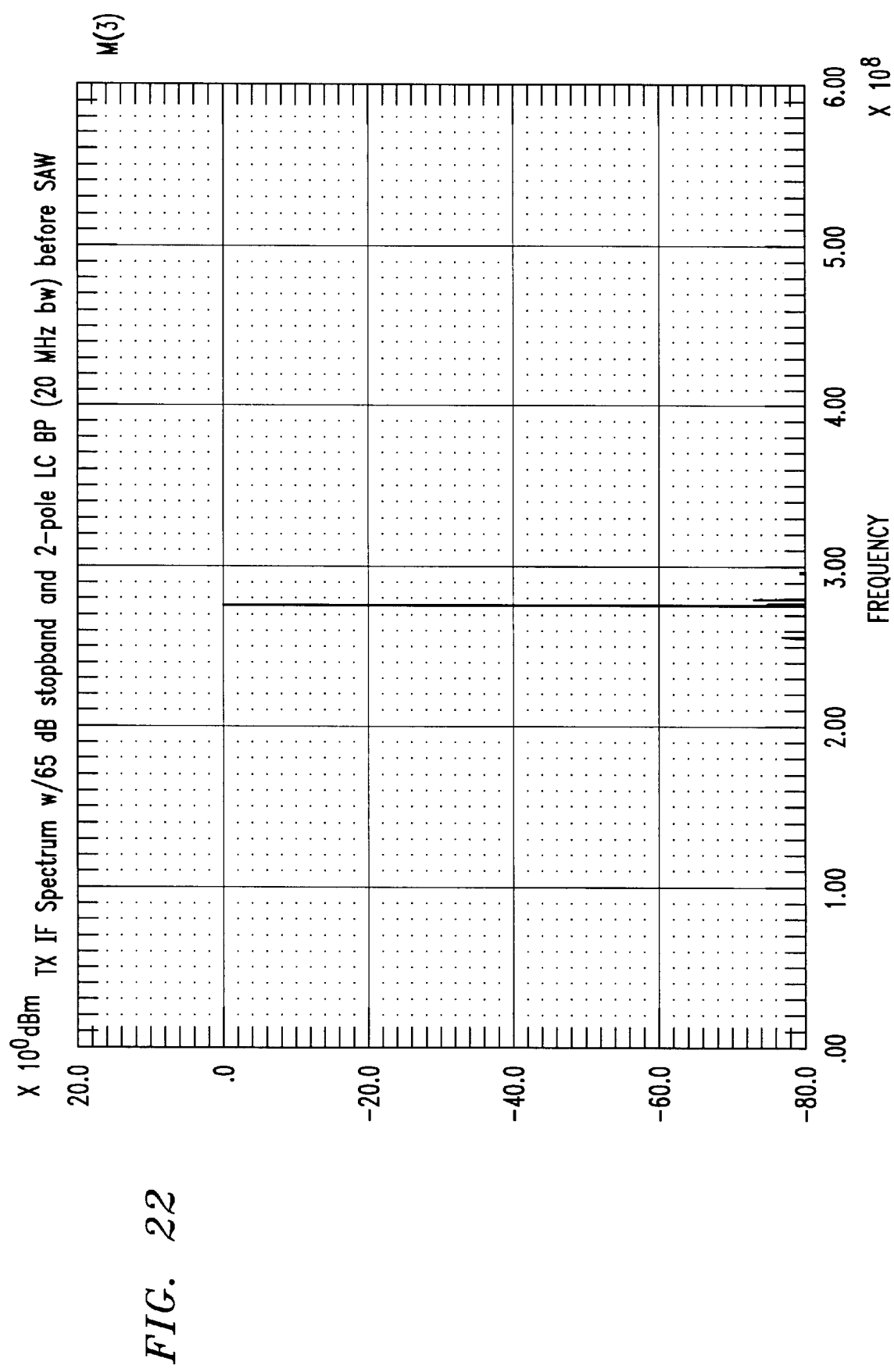

FIGS. 20–22 show the expected results using a harmonic alias as a direct intermediate frequency, together with the use of a suitable filter, e.g., a SAW bandpass filter 197 having a stopband attenuation of 45 dB, 55 dB, and 65 dB, respectively, all with an LC pre-filter having a 20 MHz bandwidth followed by a SAW filter.

In particular, FIG. 20 shows a view of the TxIF spectrum, centered at 276 MHz after filtering the square wave, discrete time output of the transmit output signal TxIF with a 2-pole LC bandpass pre-filter before the bandpass filter 197. In the simulations of FIGS. 20–22, the pre-filter has a bandwidth of 20 MHz and a center frequency of 276 MHz, followed by a 276 MHz SAW filter with a stopband attenuation of 45 dB. The stopband attenuation of 45 dB is based on a worst-case minimum stopband attenuation of an exemplary GSM SAW filter, e.g., model B4828 commercially available from SIEMENS-MATSUSHITA.

The pre-filter pre-selects a desired alias, though suppression of the closer adjoining aliases is imperfect with a 2-section LC bandpass filter with a bandwidth of 20–30 MHz. The idea is that the entire unfiltered "comb" of aliases are preferably not propagated onto a following RF chip or module, thus the LC bandpass filter may be placed between the TxIF from the modem and the following RF module. Preferably, the following RF chip will buffer the signal filtered by the LC bandpass filter, and then again filter it (e.g., through another SAW filter, or the same SAW filter multiplexed for use both in a receive mode and in a transmit mode.)

FIG. 21 shows a view of the transmit output signal TxIF spectrum, centered at the $27^{th}$ harmonic alias at 276 MHz after filtering the square wave, discrete time output of the transmit output signal TxIF with a 2-pole LC bandpass pre-filter having a bandwidth of 20 MHz and a center frequency of 276 MHz, followed by a 276 MHz SAW filter having a stopband attenuation of 55 dB. The stopband attenuation of 55 dB is based on a worst-case minimum and typical stopband attenuation of an exemplary GSM SAW filter, e.g., the model B4828.

FIG. 22 shows a view of the transmit output signal TxIF spectrum, centered at 276 MHz after filtering the square wave, discrete time output of the transmit output signal TxIF with a 2-pole LC bandpass pre-filter having a bandwidth of 20 MHz and a center frequency of 276 MHz, followed by a 276 MHz SAW filter having a stopband attenuation of 65 dB. The stopband attenuation of 65 dB is based on a worst-case typical stopband attenuation of an exemplary GSM SAW filter, e.g., the model B4828.

Figure 23:
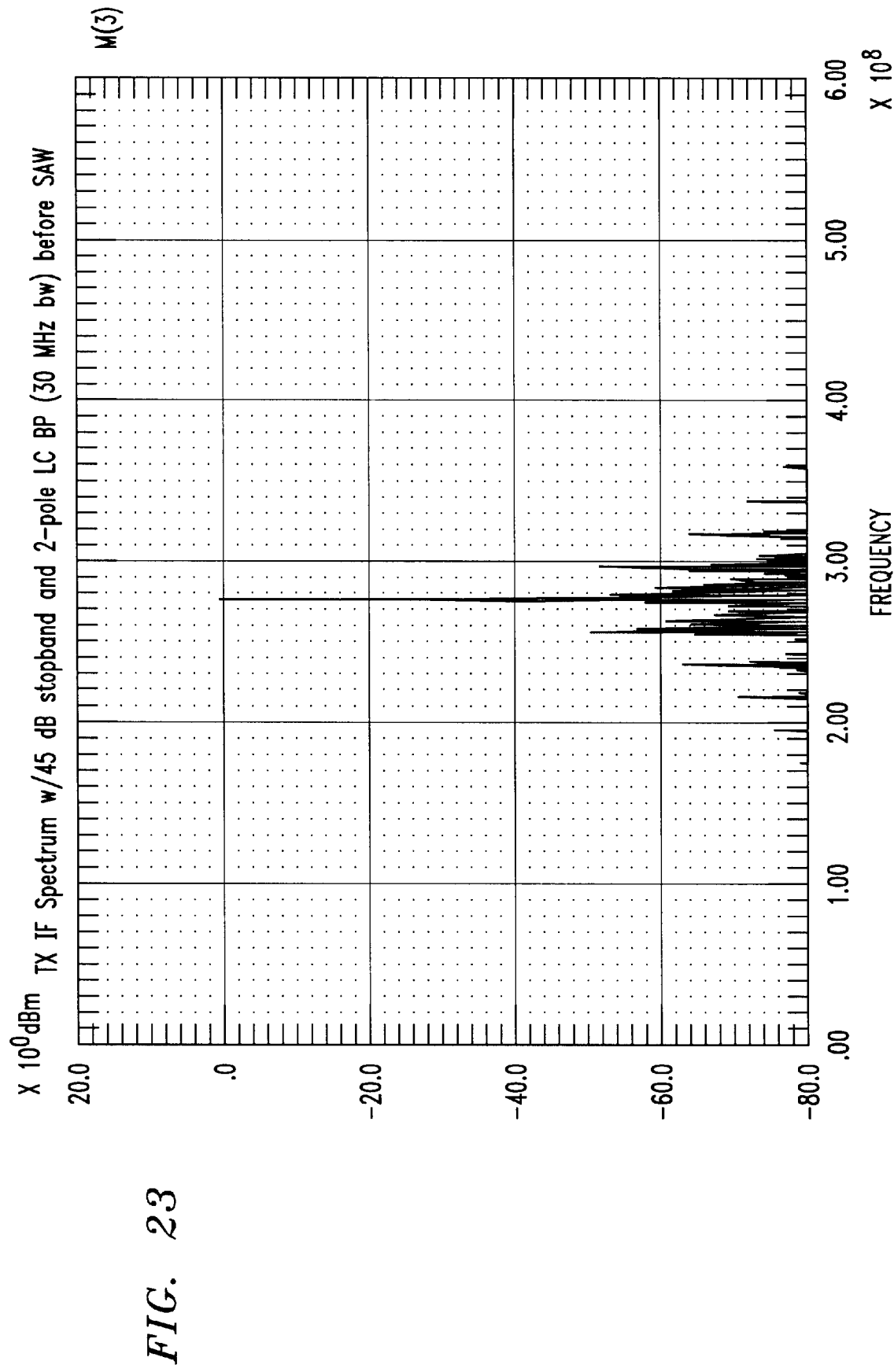
Figure 24:
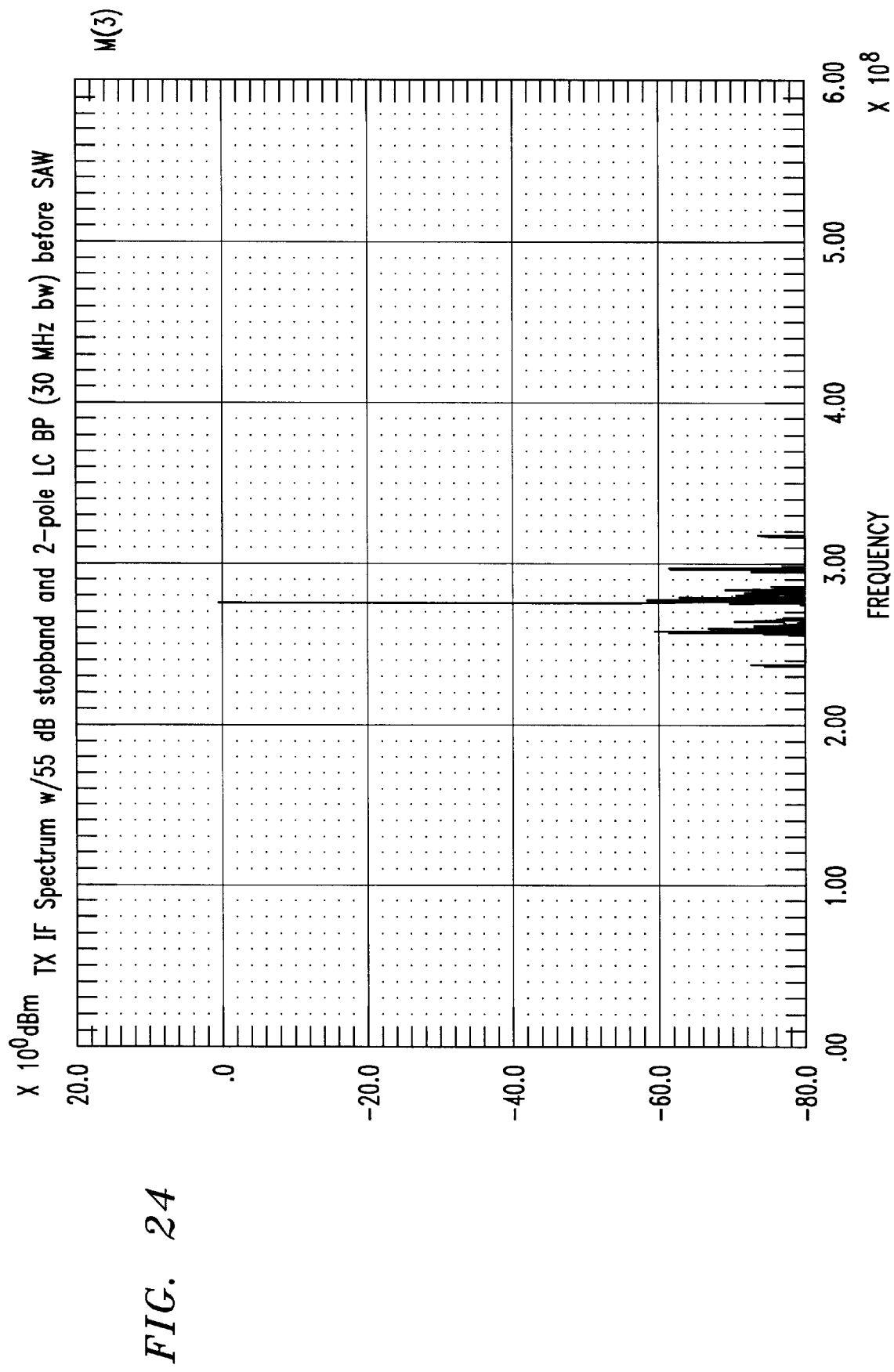
Figure 25:
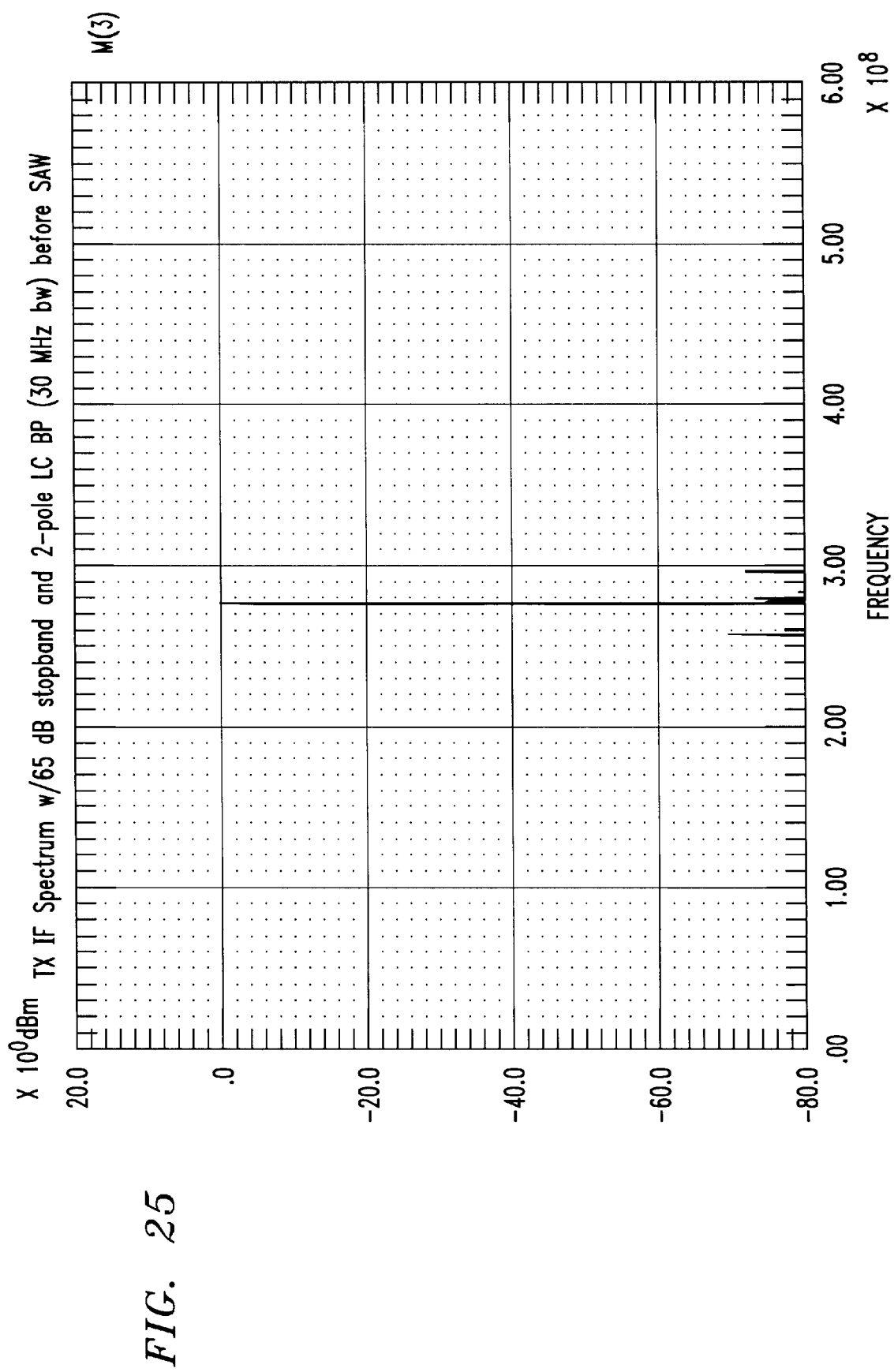

FIGS. 23–25 show the expected results using a harmonic alias as a direct intermediate frequency, together with the use of a suitable bandpass filter 197 having a stopband attenuation of 45 dB, 55 dB, and 65 dB, respectively, all including an LC pre-filter having a 30 MHz bandwidth and a SAW filter.

In particular, FIG. 23 shows a view of the TxIF spectrum, centered at 276 MHz after filtering the square wave, discrete time output of the transmit output signal TxIF with a 2-pole LC bandpass pre-filter having a bandwidth of 30 MHz and a center frequency of 276 MHz, followed by a 276 MHz SAW filter with a stopband attenuation of 45 dB. The stopband attenuation of 45 dB is based on a worst-case minimum stopband attenuation of an exemplary GSM SAW filter, e.g., the model B4828.

FIG. 24 shows a view of the transmit output signal TxIF spectrum, centered at the $27^{th}$ harmonic alias at 276 MHz after filtering the square wave, discrete time output of the transmit output signal TxIF with a 2-pole LC bandpass pre-filter having a bandwidth of 30 MHz and a center frequency of 276 MHz, followed by a 276 MHz SAW filter having a stopband attenuation of 55 dB. The stopband attenuation of 55 dB is based on a worst-case minimum and typical stopband attenuation of an exemplary GSM SAW filter, e.g., the model B4828.

FIG. 25 shows a view of the transmit output signal TxIF spectrum, centered at 276 MHz after filtering the square wave, discrete time output of the transmit output signal TxIF with a 2-pole LC bandpass pre-filter having a bandwidth of 30 MHz and a center frequency of 276 MHz, followed by a 276 MHz SAW filter having a stopband attenuation of 65 dB. The stopband attenuation of 65 dB is based on a worst-case typical stopband attenuation of an exemplary GSM SAW filter, e.g., the model B4828.

Figure 26:
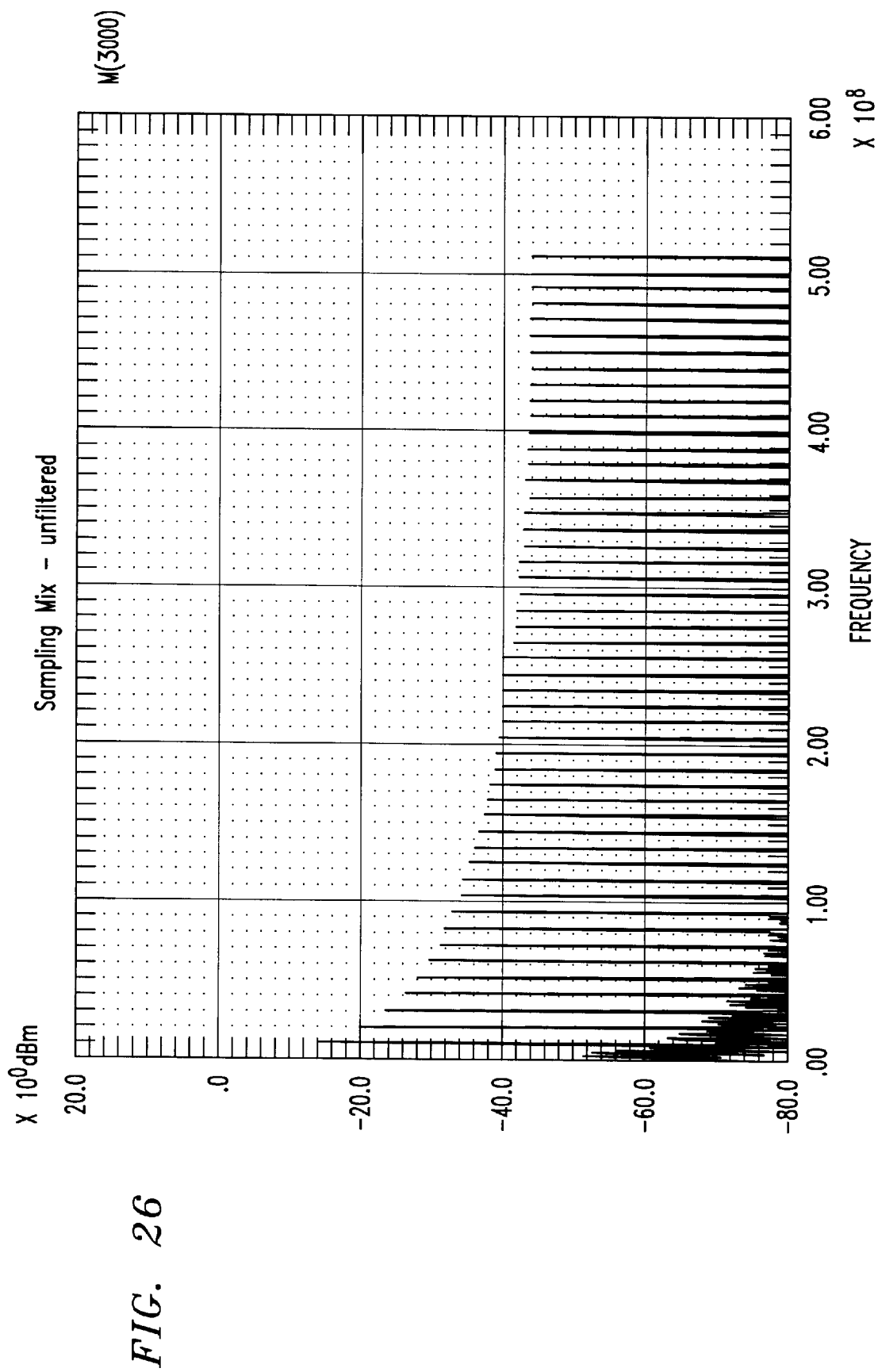

FIG. 26 shows an exemplary output of the sampling mixer from DC to 512 MHz. The spectrum shown in FIG. 26 is the result of sub-sampling of the bandlimited 276 MHz IF frequency signal with the master clock, e.g., 10.240 MHz. Note that as shown in FIG. 26, the desired low IF at 480 KHz is hidden in the left vertical axis. The signal at−14 dB is the nearest pair of harmonic aliases at 10.24 MHz+/−480 KHz.

To obtain the expected results shown in FIG. 26, an edge-triggered sample-and-hold model is used, triggered by the edge of the master clock. However, in practice the master clock may be used to trigger a sampling pulse generator, which generates a narrow sampling pulse to control the sampling mixer.

Figure 27:
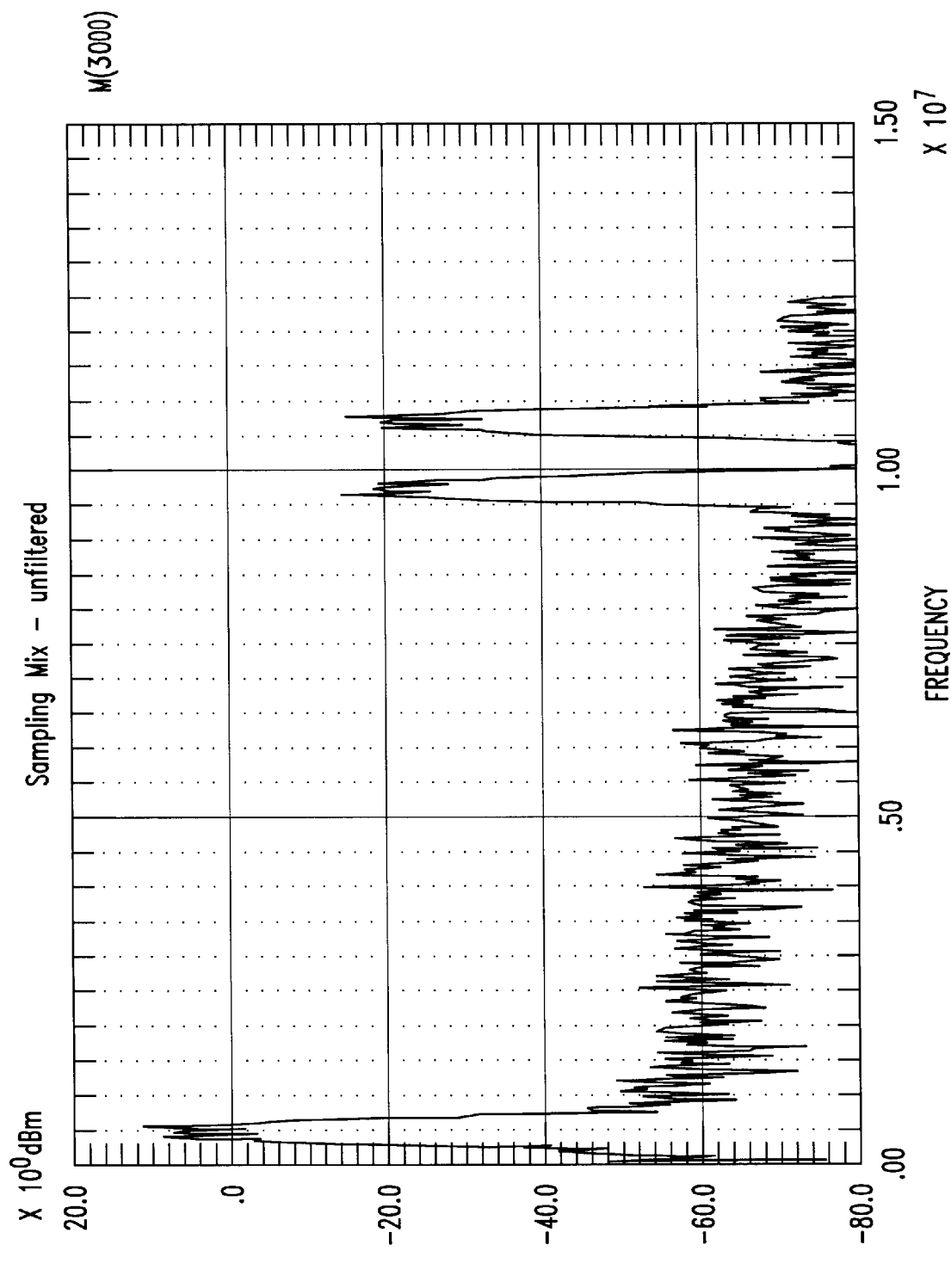

FIG. 27 is a zoomed in view of FIG. 26, showing the desired low IF at 480 KHz dominating, and the closest harmonic aliases at 10.24 MHz+/−480 KHz. This makes low IF filtering simple to perform, e.g., on an integrated circuit. For instance, the low IF filtering may comprise essentially a series of lowpass poles distributed through a low IF amplifier/limiter chain. This suppresses the higher order aliases, limits the noise bandwidth of the IF amplifier/limiter chain, and reduces the buildup of broadband noise.

Figure 28:
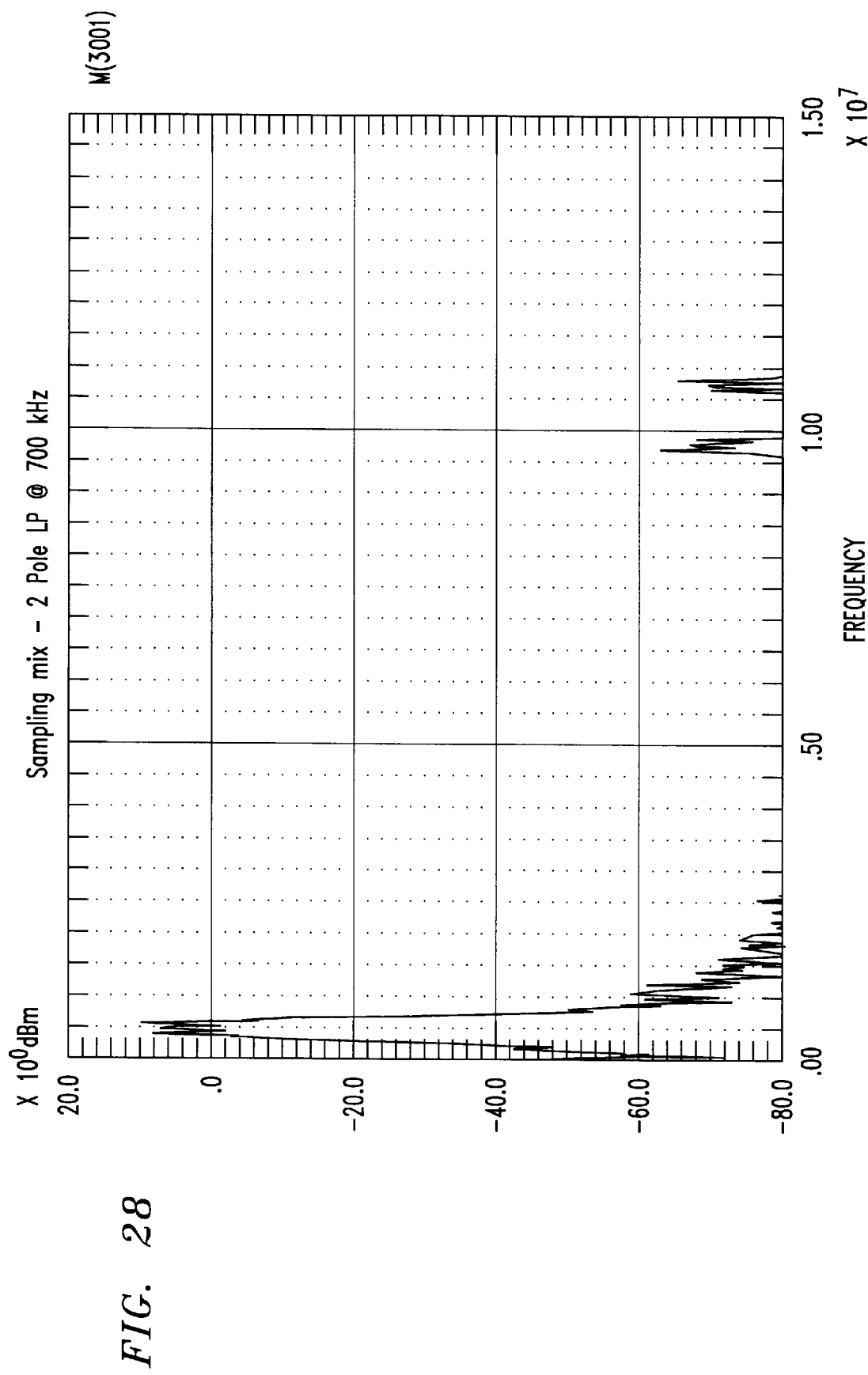

FIG. 28 is similar to FIGS. 26 and 27 but shows the use of a simple 2-pole lowpass filter at 700 KHz. Note that this simple filter performs a fairly sufficient suppression of the higher order aliases which appear in the output of the sampling mixer. However, it may be preferred that additional lowpass filtering be distributed through the IF chain to prevent buildup of broadband noise, and to keep signals such as a pre-scaler output, a modulus control, etc., from getting amplified/mixed in an IF/limiter chain.

Figure 29:
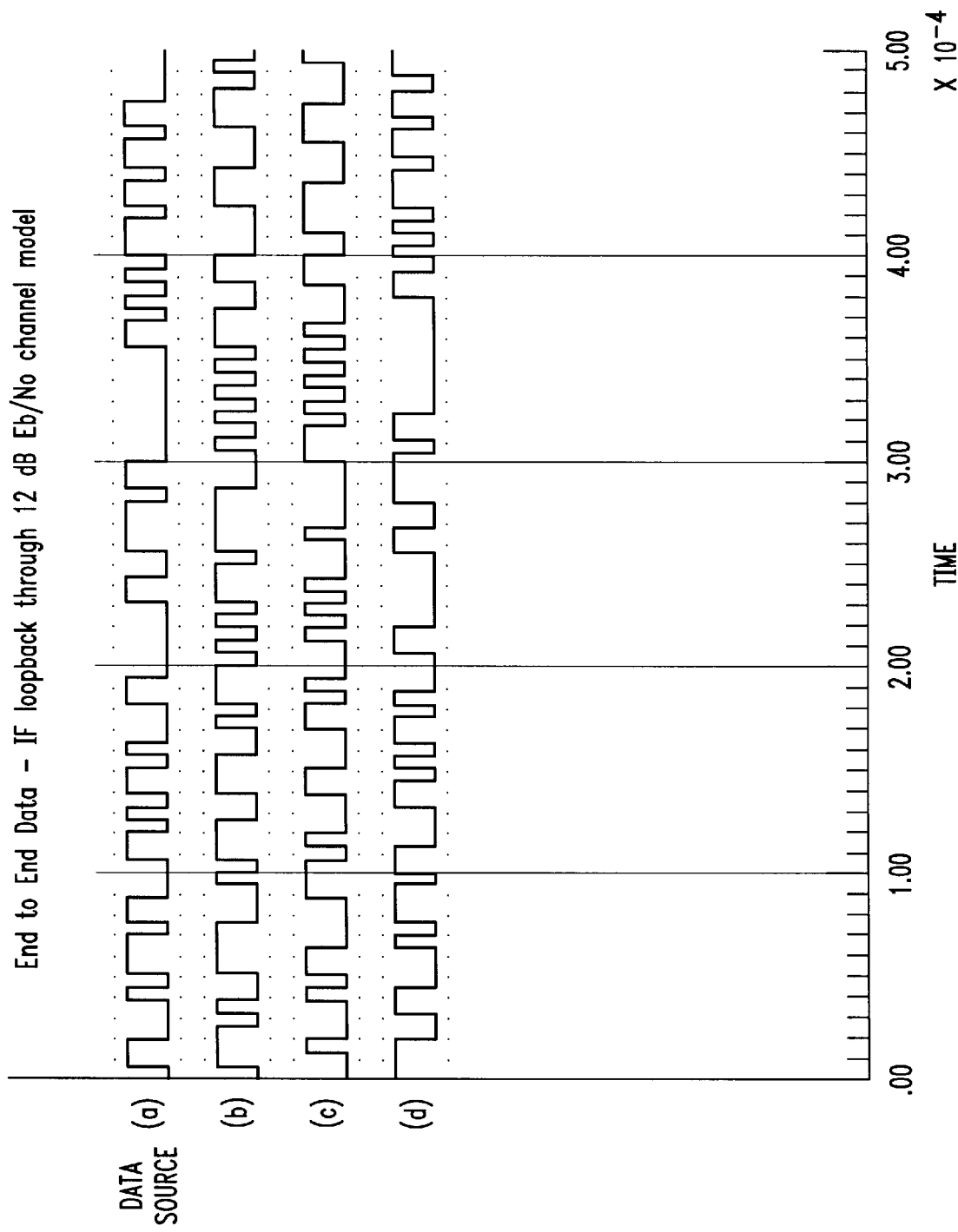

FIG. 29 shows a simulated result of an end-to-end data IF loopback through 12 dB Eb/No channel model. The end-to-end simulation shown in FIG. 29 inserts an AWGN channel between the transmitter and receiver that sets Eb/No to approximately 12 dB.

In particular, in FIG. 29, waveform (a) shows the PN data source at the transmitting end.

Waveform (b) shows not-return-to-zero (NRZI) encoded PN data to the BFSK modulator 100.

Waveform (c) shows the raw data output from the BFSK demodulator 200. Note that the NRZI-encoded data is inverted due to the selection of a harmonic alias which is a lower sideband relative to the 10.24 MHz harmonic.

Lastly, waveform (d) of FIG. 29 is the received data output from the demodulator 200, shifted from the original data shown in waveform (a).

Although shown with a specific embodiment utilizing the 276 MHz harmonic alias, any harmonic alias may be used in accordance with this aspect of the present invention. For instance, the harmonic alias may be placed at 400 MHz to make use of commercially available bandpass filters for GSM cellular telephones at this frequency. Different master clock and "low digital IF" frequencies may be employed to arrange for a harmonic alias at almost any desired high IF frequency.

Thus, in accordance with the principles of the present invention, required chip area, power consumption, and the amount of digital signal processing are reduced, in particular by employing modulation and demodulation techniques which operate at only 1-bit precision with a very modest implementation loss relative to conventional, multi-bit precision implementations. Moreover, a digital FSK modem can be implemented without the use of expensive and complicated multi-bit data converters required by conventional techniques.

While the invention has been described with reference to the exemplary embodiments thereof, those skilled in the art will be able to make various modifications to the described embodiments of the invention without departing from the true spirit and scope of the invention.

What is claimed is:

1. A continuous phase frequency shift keying modulator, comprising:
    a logic-based numerically controlled oscillator adapted to alter an output frequency of an output digital signal based on an input data symbol; and
    a logic-based mixer to up-convert said output digital signal output from said numerically controlled oscillator to a desired intermediate frequency.

2. The continuous phase frequency shift keying modulator according to claim 1, wherein:
    said continuous phase frequency shift keying modulator generates a binary frequency shift keyed signal.

3. The continuous phase frequency shift keying modulator according to claim 1, wherein:
    said continuous phase frequency shift keying modulator generates an M-ary frequency shift keyed signal, where M is greater than 1.

4. The continuous phase frequency shift keying modulator according to claim 1, wherein:
    said logic-based mixer is clocked at a master clock offset from said desired intermediate frequency by a value of a nominal center frequency of said output digital signal.

5. The continuous phase frequency shift keying modulator according to claim 1, wherein said logic-based mixer comprises one of:
    an XNOR logic function; and
    an XOR logic function.

6. The continuous phase frequency shift keying modulator according to claim 1, wherein:
    said intermediate frequency is determined by a difference between a frequency output by said frequency shift keying modulator and a frequency at which said logic-based mixer is clocked.

7. The continuous phase frequency shift keying modulator according to claim 1, wherein said logic-based numerically controlled oscillator consists of:
    a plurality of logic gate components.

8. The continuous phase frequency shift keying modulator according to claim 1, wherein said logic-based mixer consists of:
    a plurality of logic gate components.

9. The continuous phase frequency shift keying modulator according to claim 1, wherein:
    said input data symbol is 1-bit in length; and
    said logic-based modulator utilizes binary frequency shift keying techniques.

10. The continuous phase frequency shift keying modulator according to claim 1, wherein:
    said input data symbol is greater than 1-bit in length; and
    said logic-based modulator utilizes M-ary frequency shift keying techniques.

11. The continuous phase frequency shift keying modulator according to claim 1, further comprising:
    a bandpass filter after said logic-based mixer, said bandpass filter selecting said intermediate frequency.

12. The continuous phase frequency shift keying modulator according to claim 11, wherein:
    said intermediate frequency selected by said bandpass filter is an odd harmonic.

13. The continuous phase frequency shift keying modulator according to claim 1, wherein:
    said logic-based modulator is comprised in a cordless telephone.

14. An integrate and dump module, comprising:
    an up/down counter having a clock input based on a master clock signal, having a reset input based on a recovered clock signal, and having an up/down control based on a 1-bit correlation of two input data signals.

15. The integrate and dump module according to claim 14, wherein:

said recovered clock signal is a recovered symbol clock.

16. The integrate and dump module according to claim 14, wherein:

said integrate and dump module is comprised within a demodulator.

17. The 1-bit integrate and dump module according to claim 16, wherein:

said demodulator is a binary frequency shift keying demodulator.

18. The integrate and dump module according to claim 16, wherein:

said demodulator is comprised in a cordless telephone.

19. The integrate and dump module according to claim 14, wherein:

said clock signal to said up/down counter corresponds to an oversampling of an integer multiple of 4 with respect to a received symbol being integrated by said 1-bit integrate and dump module.

20. A continuous phase frequency shift keying demodulator, comprising:

a first logic-based numerically controlled oscillator adapted to output an In-phase output signal and a Quadrature output signal based on an expected frequency of a mark;

a second logic-based numerically controlled oscillator adapted to output an In-phase output signal and a Quadrature output signal based on an expected frequency of a space;

a first up/down counter adapted to count in a direction based on a first correlation between said In-phase output signal from said first logic-based numerically controlled oscillator and a received signal;

a second up/down counter adapted to count in a direction based on a second correlation between said Quadrature output signal from said first logic-based numerically controlled oscillator and said received symbol; and a first adder adapted to add a magnitude of said first correlation and a magnitude of said second correlation.

21. The continuous phase frequency shift keying demodulator according to claim 20, further comprising:

a third up/down counter adapted to count in a direction based on a third correlation between said In-phase output signal from said second logic-based numerically controlled oscillator and said received signal;

a fourth up/down counter adapted to count in a direction based on a fourth correlation between said Quadrature output signal from said second logic-based numerically controlled oscillator and said received symbol;

a second adder adapted to add a magnitude of said third correlation and a magnitude of said fourth correlation; and a magnitude comparator to select a greater one of an output from said first adder and an output from said second adder to provide a demodulated received data signal.

22. The continuous phase frequency shift keying demodulator according to claim 20, wherein:

said mark and said space are components of a BFSK modulated input signal.

23. A method of frequency shift keyed demodulating a data signal with logic components, comprising:

outputting a first 1-bit precision In-phase output digital signal and a first 1-bit precision Quadrature output digital signal based on an expected frequency;

correlating a first difference between said first 1-bit precision In-phase output digital signal and a received symbol, and a second difference between said first 1-bit precision Quadrature output digital signal and said received symbol;

integrating said correlated first difference in an oversampled manner with respect to said received symbol, and said correlated second difference in an oversampled manner with respect to said received symbol; and adding a magnitude of said integrated correlated first difference and a magnitude of said integrated correlated second difference.

24. The method of frequency shift keyed demodulating a data signal with logic components according to claim 23, wherein:

said integration is performed with an up/down counter.

25. The method of frequency shift keyed demodulating a data signal with logic components according to claim 23, wherein:

said oversampling is an integer multiple of 4 oversampling.

26. The method of frequency shift keyed demodulating a data signal with logic components according to claim 23, wherein:

said frequency shift keyed demodulation is binary frequency shift keying.

* * * * *